US007882041B2

(12) United States Patent
Gibbons et al.

(10) Patent No.: US 7,882,041 B2
(45) Date of Patent: Feb. 1, 2011

(54) SYSTEM AND METHOD FOR OPTIMIZING THE EFFECTIVENESS OF AN EDUCATIONAL INSTITUTION

(75) Inventors: Peter Gibbons, Fairfax, VA (US); James Etter, Fairfax, VA (US)

(73) Assignee: American Public University Systems, Inc., Charles Town, WV (US)

( * ) Notice: Subject to any disclaimer, the term of this patent is extended or adjusted under 35 U.S.C. 154(b) by 1423 days.

(21) Appl. No.: 11/032,587

(22) Filed: Jan. 10, 2005

(65) Prior Publication Data

US 2006/0036460 A1 Feb. 16, 2006

Related U.S. Application Data

(60) Provisional application No. 60/535,566, filed on Jan. 9, 2004.

(51) Int. Cl.
*G06Q 50/00* (2006.01)

(52) U.S. Cl. ...................................... 705/326; 705/327

(58) Field of Classification Search ....................... None
See application file for complete search history.

(56) References Cited

U.S. PATENT DOCUMENTS

| | | | | |
|---|---|---|---|---|
| 6,270,351 | B1 * | 8/2001 | Roper | 434/118 |
| 6,460,042 | B1 * | 10/2002 | Hitchcock et al. | 707/10 |
| 6,651,071 | B1 * | 11/2003 | O'Brien et al. | 707/102 |
| 7,158,937 | B2 * | 1/2007 | Easter et al. | 705/1 |
| 7,260,355 | B2 * | 8/2007 | L'Allier et al. | 434/362 |
| 2001/0049692 | A1 * | 12/2001 | Callaghan et al. | 707/104.1 |
| 2002/0040301 | A1 * | 4/2002 | Royall et al. | 705/1 |
| 2004/0110119 | A1 * | 6/2004 | Riconda et al. | 434/350 |

* cited by examiner

*Primary Examiner*—Traci L Casler
(74) *Attorney, Agent, or Firm*—The Marbury Law Group, PLLC

(57) ABSTRACT

A system and method for optimizing the effectiveness of an educational institution. Means are provided for establishing a relationship between educational institution and a student wherein the student's progress is monitored from registration through and beyond graduation. Monitoring means allow the student's progress to be measured and the student's need for support and attention to be determined. Additional means permit an administrator of an educational institution to measure the effectiveness of an educational institution's program and to determine prospectively the resources needed to meet student commitments.

5 Claims, 33 Drawing Sheets

200
INITIAL
CONTACT
STAGE
205
INITIAL
CONTACT
FOM
210
ACCEPTANCE
STAGE
215
ACCEPTANCE
FOM
220
FIRST
COURSE
STAGE
225
FIRST
COURSE FOM
270
DATASTORE
230
LAST COURSE
STAGE
235
LAST COURSE
FOM
240
GRADUATION
STAGE
245
GRADUATION
FOM
255
ALUMNI
STAGE
255
ALUMNI FOM

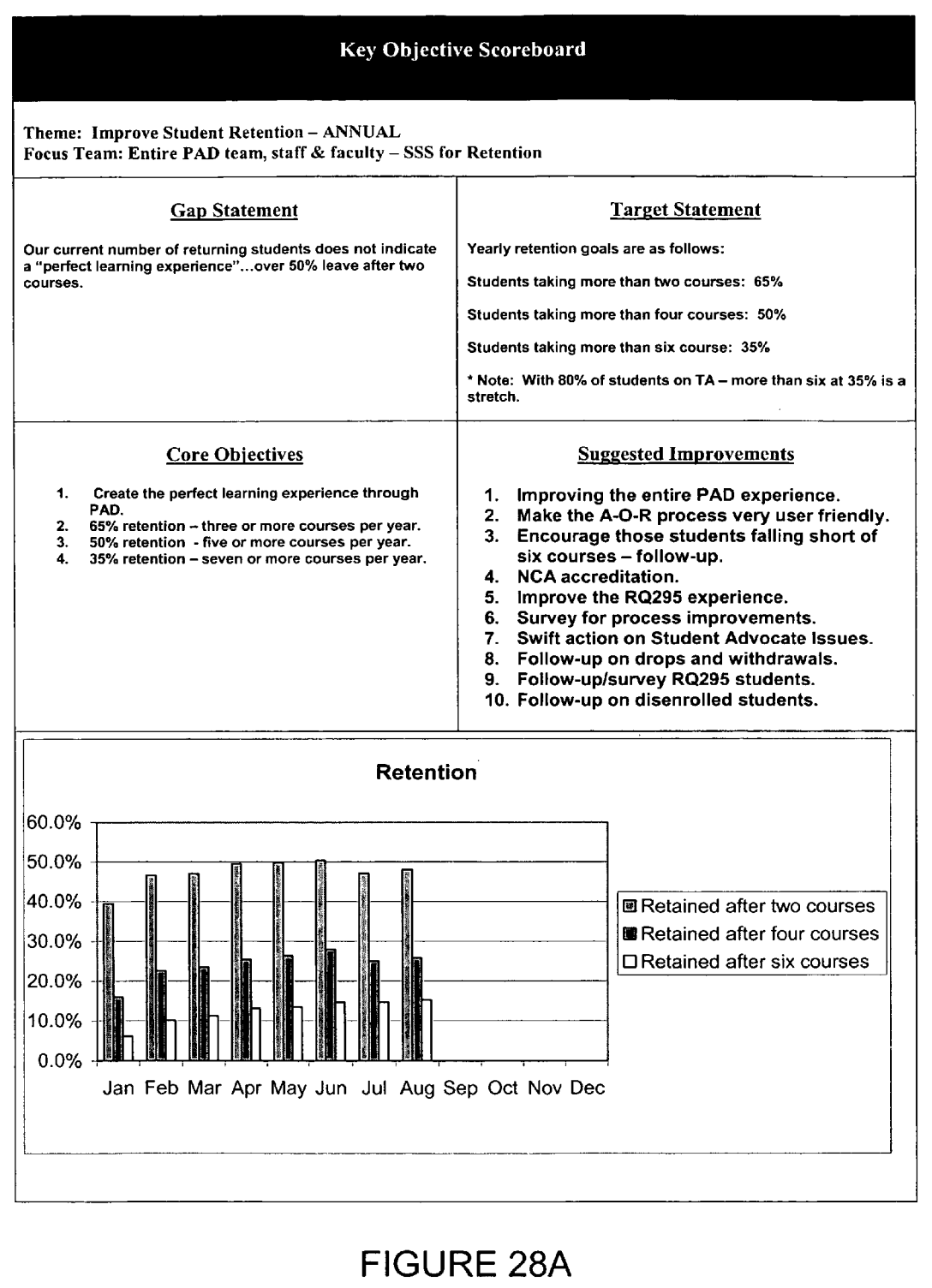

Key Objective Scoreboard

Theme: Improve Student Retention – ANNUAL
Focus Team: Entire PAD team, staff & faculty – SSS for Retention

Gap Statement

Our current number of returning students does not indicate a "perfect learning experience"...over 50% leave after two courses.

Target Statement

Yearly retention goals are as follows:

Students taking more than two courses: 65%

Students taking more than four courses: 50%

Students taking more than six course: 35%

* Note: With 80% of students on TA – more than six at 35% is a stretch.

Core Objectives

1. Create the perfect learning experience through PAD.
2. 65% retention – three or more courses per year.
3. 50% retention - five or more courses per year.
4. 35% retention – seven or more courses per year.

Suggested Improvements

1. Improving the entire PAD experience.
2. Make the A-O-R process very user friendly.
3. Encourage those students falling short of six courses – follow-up.
4. NCA accreditation.
5. Improve the RQ295 experience.
6. Survey for process improvements.
7. Swift action on Student Advocate Issues.
8. Follow-up on drops and withdrawals.
9. Follow-up/survey RQ295 students.
10. Follow-up on disenrolled students.

FIGURE 28A

SYSTEM AND METHOD FOR OPTIMIZING THE EFFECTIVENESS OF AN EDUCATIONAL INSTITUTION

RELATIONSHIP TO OTHER APPLICATIONS

This application claims the benefit of U.S. Provisional Application No. 60/535,566 filed Jan. 9, 2004, which is hereby incorporated by reference in its entirety for all purposes.

BACKGROUND

This invention relates generally to the field of providing quality education. More particularly, the present invention provides means for optimizing the effectiveness of an educational institution by measuring student needs, by ascertaining resource requirements of the educational institution prospectively, and by measuring the effectiveness of the programs initiated by the educational institution.

The phrase "educational institution" typically engenders images of a physical place, perhaps with a tree-lined campus, student dormitories, and a faculty member lecturing before a classroom of students. The Internet has spawned another kind of educational institution, one with a virtual classroom in which students interact with a teacher via a computer. While brick and mortar facilities have not been replaced, the Internet has brought the content of the classroom to the home and office.

All educational institutions strive to meet each student's particular needs, to provide the resources needed to meet the institutions commitment to the students, and to measure the effectiveness of the institution in accomplishing its goals. The measures used by brick and mortar facilities and current distance learning institutions are the same. Attendance, homework, test scores, and exams and similar measures are used to evaluate students. The resources of an educational institution are allocated based on the intended course of study indicated by students in their applications and at registration. Such institutions measure their own performance based on drop-out and graduation ratios.

These measures suffer because they are determined after the fact. By the time it is known that a student has lost interest in classwork, it may be too late to counsel him or her. Allocating resources solely based on applications or registrations places the institution at risk of misallocating those resources should students change their academic plans. Drop-out ratios and graduation ratios do not permit an institution to detect and correct problems on a timely basis.

The Internet has also changed the way the physical educational institution interacts with students. For example, course registration servers are used by colleges and universities to interact with students. Typically, an enrolling student visits a Web site where that student enters his or her name, selects courses from descriptions displayed on the site, and is advised as to the availability of the course session and the times that it is provided. Network-based course registration provides a student a means to manage class requirements and schedules. From the perspective of the educational institution, network-based course registration is a management tool that automates the registration process and allows limited means for institutions to track course participation by category, subcategory, location, and/or course number.

In a network-based distance-learning environment (herein, a "virtual university"), a student is not only expected to register for classes electronically, but to receive course material, take tests, and obtain guidance via an electronic classroom formed by networking students and an instructor. However, unless the student is asking for assistance or an observant teacher notes problems in the student's class work, the electronic classroom setting alone does little to measure a student's performance during the student's involvement with the virtual university. Further, the electronic classroom provides little in the way of guidance as to the prospective resources needed by the virtual university to satisfy its commitments to its students.

What would be desirable are means for establishing a relationship between an educational institution and a student wherein the student's progress is monitored from registration through and beyond graduation. Monitoring means would allow the student's progress to be measured and the student's need for support and attention to be determined. Means would also be provided to permit administrators of the educational institution to measure the effectiveness of virtual university programs and to determine prospectively the resources needed to meet student commitments.

SUMMARY

An embodiment of the present invention is a system and method for establishing a relationship between an educational institution and a student wherein the student's progress and needs are monitored from registration through and beyond graduation. In this embodiment of the present invention, a student and an educational institution interact via a network interface. This interaction evolves through various monitoring stages. By way of illustration and not as a limitation, the relationship starts with the initial contact stage, and moves through an acceptance stage, a first course stage, a last course stage, a graduation stage, and finally an alumni stage. Each of these stages has a family of measures (FOM) comprising one or more performance metrics that are used to gauge the progress and/or experience of the student in progressing to and through that stage and to determine whether a student needs assistance. Additionally, each student establishes a dynamic academic plan that is monitored by an educational institution to dynamically manage its resource requirements prospectively.

It is therefore an aspect of the present invention to provide means for a student to establish a relationship with an educational institution.

It is another aspect of the present invention to monitor the student's progress and experience and to quantify that progress and experience using one or more FOMs.

It is still another aspect of the present invention to build a dynamic academic plan for each student based on goals selected by that student.

It is aspect of the present invention to project resource requirements (e.g., courses, teachers, network upgrades) of an educational institution based on the dynamic academic plans of all students.

It is still another aspect of the present invention to provide additional resources to a student based on the progress of the student as measured by an FOM.

These aspects and other embodiments will become apparent by reference to the drawings and descriptions that follow.

In an embodiment of the present invention, a method for optimizing the effectiveness of a virtual university environment comprises preparing a dynamic academic plan for each member of a student body. The dynamic academic plan of each member of the student body is consolidated into a master plan. The resources required to execute the master plan are determined over the time period spanned by the master plan.

In yet another embodiment of the present invention, a method for optimizing the effectiveness of a virtual university environment comprises establishing one or more triggering events relating a behavior of a student to a student need. A student is monitored for the occurrence of a triggering event. In the event a triggering event occurs, a response is initiated.

In still another embodiment of the present invention, a method for optimizing the effectiveness of a virtual university environment comprises capturing data relating a behavior of a prospective student to one or more effectiveness metrics. One or more effectiveness metrics are calculated from the captured data. One of the one or more effectiveness metrics is compared to a target for that effectiveness metric. In the event that one of the one or more effectiveness metrics does not meet or exceed the target for that metric, a response is initiated.

In another embodiment of the present invention, a method for optimizing the effectiveness of a virtual university environment comprises capturing data relating a behavior of a student to one or more effectiveness metrics. One or more effectiveness metrics from the captured data are calculated. One of the one or more effectiveness metrics is compared to a target for that effectiveness metric. In the event the one of the one or more effectiveness metrics does not meet or exceed the target for that metric, a response is initiated.

In yet another embodiment of the present invention, a method for optimizing the effectiveness of a virtual university environment comprises preparing a dynamic academic plan for each member of a student body. One or more course offerings for each member of a student body are mapped based on the academic plan of that member. In an alternate embodiment of the present invention, the method further comprises determining if the dynamic academic plan of one member of the student body has been changed. If the dynamic academic plan of that one member has been changed, one or more course offerings for that member are mapped based on the changed academic plan.

DESCRIPTION OF THE DRAWINGS

FIGS. 28A-F illustrate various reports related to the measured Family of Measures (FOMs), wherein FIG. 28A is an exemplary Key Objective Scoreboard related to student retention, FIG. 28B is an exemplary Key Objective Scoreboard drawn to increasing Transfer Credit Evaluation (TCE) applications, FIG. 28C is an exemplary Key Objective Scoreboard drawn to increasing the applicant to orientation conversion rate, FIG. 28D is an exemplary Key Objective Scoreboard drawn to orientation to new student conversions, FIG. 28E is an exemplary Key Objective Scoreboard drawn to increasing new student conversions, and FIG. 28F is an exemplary Key Objective Scoreboard drawn to the tracking of daily registrations.

DETAILED DESCRIPTION

Figure 1:
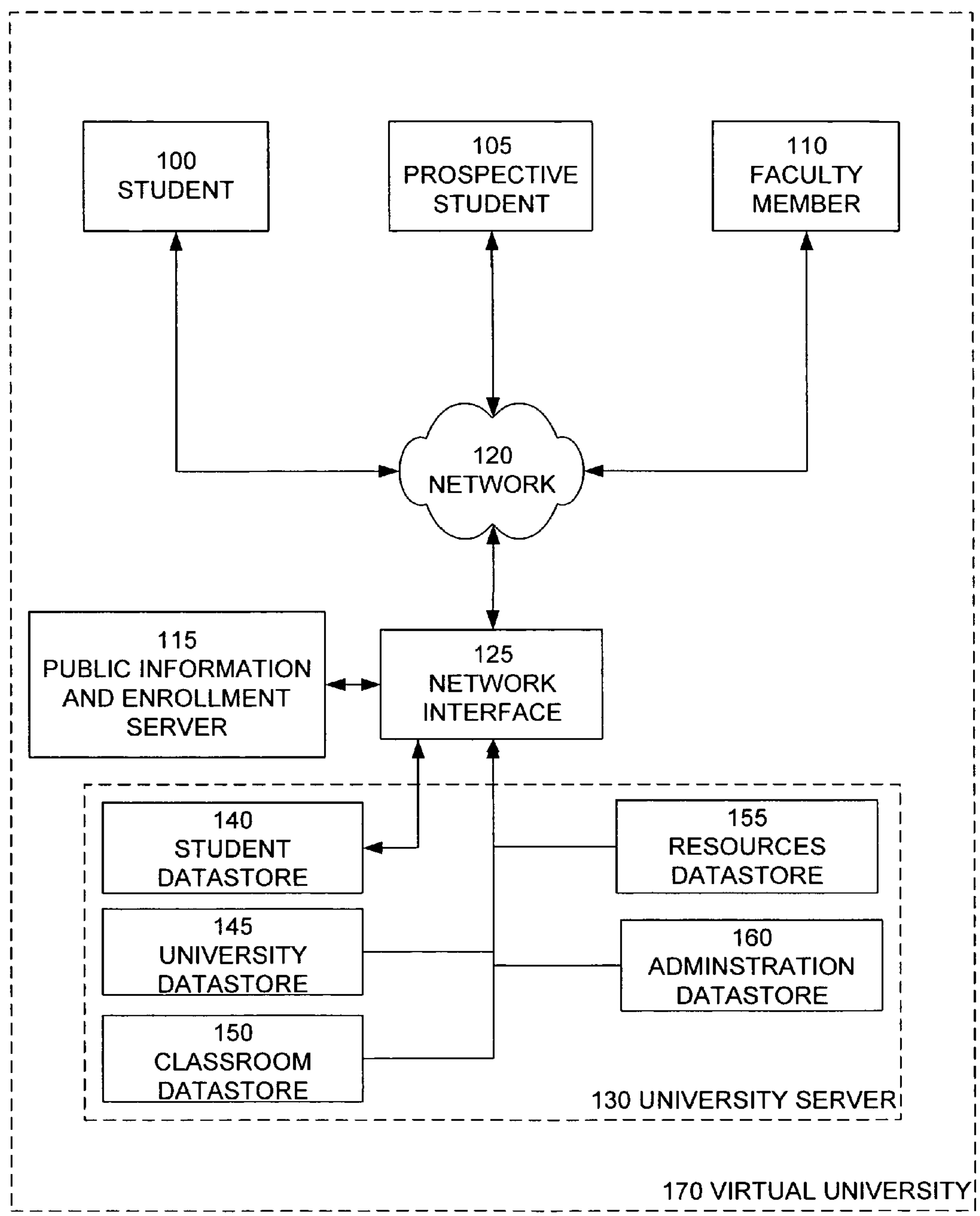
FIG. 1 illustrates a block diagram of a virtual university according to an embodiment of the present invention.

Objectives and various embodiments of the present invention are described in the detailed discussion that follows.

In one embodiment of the present invention, a method for optimizing the effectiveness of a virtual university environment comprises preparing a dynamic academic plan for each member of a student body. The dynamic academic plan of each member of the student body is consolidated into a master plan. The resources required to execute the master plan are determined over the time period spanned by the master plan.

In yet another embodiment of the present invention, a method for optimizing the effectiveness of a virtual university environment comprises establishing one or more triggering events relating a behavior of a student to a student need. A student is monitored for the occurrence of a triggering event. In the event a triggering event occurs, a response is initiated.

In still another embodiment of the present invention, a method for optimizing the effectiveness of a virtual university environment comprises capturing data relating a behavior of a prospective student to one or more effectiveness metrics. One or more effectiveness metrics are calculated from the captured data. One of the one or more effectiveness metrics is compared to a target for that effectiveness metric. In the event that one of the one or more effectiveness metrics does not meet or exceed the target for that metric, a response is initiated.

In another embodiment of the present invention, a method for optimizing the effectiveness of a virtual university environment comprises capturing data relating a behavior of a student to one or more effectiveness metrics. One or more effectiveness metrics from the captured data are calculated. One of the one or more effectiveness metrics is compared to a target for that effectiveness metric. In the event the one of the one or more effectiveness metrics does not meet or exceed the target for that metric, a response is initiated.

In yet another embodiment of the present invention, a method for optimizing the effectiveness of a virtual university environment comprises preparing a dynamic academic plan for each member of a student body. One or more course offerings for each member of a student body are mapped based on the academic plan of that member. In an alternate embodiment of the present invention, the method further comprises determining if the dynamic academic plan of one member of the student body has been changed. If the dynamic academic plan of that one member has been changed, one or more course offerings for that member are mapped based on the changed academic plan.

In a further embodiment of the present invention, a system for optimizing the effectiveness of a virtual university environment comprises means for preparing a dynamic academic plan for each member of a student body. A means for the dynamic academic plan of each member of the student body to be consolidated into a master plan is further provided. Means are included for the resources required to execute the master plan to be determined over the time period spanned by the master plan.

In yet another embodiment of the present invention, a system for optimizing the effectiveness of a virtual university environment comprises means for establishing one or more triggering events relating a behavior of a student to a student need. Means are included for a student to be monitored for the occurrence of a triggering event. In the event a triggering event occurs, a means for response is initiated.

In still another embodiment of the present invention, a system for optimizing the effectiveness of a virtual university environment comprises means for capturing data relating a behavior of a prospective student to one or more effectiveness metrics. Means for one or more effectiveness metrics to be calculated from the captured data are included. Means are included for one of the one or more effectiveness metrics to be compared to a target for that effectiveness metric. In the event that one of the one or more effectiveness metrics does not meet or exceed the target for that metric, a means for response is initiated.

In another embodiment of the present invention, a system for optimizing the effectiveness of a virtual university environment comprises means for capturing data relating a behavior of a student to one or more effectiveness metrics. Means are included for one or more effectiveness metrics from the captured data to be calculated. Means are included for one of the one or more effectiveness metrics to be compared to a target for that effectiveness metric. In the event the one of the one or more effectiveness metrics does not meet or exceed the target for that metric, a means for response is initiated.

In yet another embodiment of the present invention, a system for optimizing the effectiveness of a virtual university environment comprises means for preparing a dynamic academic plan for each member of a student body. Means are included for one or more course offerings for each member of a student body to be mapped based on the academic plan of that member. In an alternate embodiment of the present invention, the system further comprises means for determining if the dynamic academic plan of one member of the student body has been changed. If the dynamic academic plan of that one member has been changed, means are included for one or more course offerings for that member to be mapped based on the changed academic plan.

An embodiment of the present invention provides means for establishing a relationship between an educational institution and a student wherein a student's progress and needs are monitored from registration through and beyond graduation. To illustrate this relationship, an exemplary embodiment is described in which a relationship is established between a network-based remote learning institution (a "virtual university") in which a student and a virtual university interact via a network interface. The interaction evolves through various "monitoring stages." While the relation and interaction are described in terms of a virtual university, the invention is not so limited. As those skilled in the art will appreciate, the teachings of the exemplary embodiment may be applied to other forms of educational institutions without departing from the scope of the present invention.

FIG. 1 illustrates a block diagram of a virtual university according to an embodiment of the present invention. A student 100, a prospective student 105, and a faculty member 110 (collectively, "remote users") each have access to a network interface 125 via a network 120. The network interface 125 determines whether a particular remote user may "enter" (access) a virtual university 170. By way of illustration, a student 100 presenting the proper credentials may enter the virtual university 170 and access a student record (not shown) in a student datastore 140 pertaining to that student 100 only. A faculty member 110 presenting the proper credentials may enter the virtual university 170 and access those student records in student datastore 140 that pertain to each student 100 enrolled in one or more classes taught by that faculty member 110. A prospective student 105 may not enter the virtual university 170 but may access a public information and enrollment server 115. As will be apparent to those skilled in the art, other permission rules may be established without departing from the scope of the present invention.

In an embodiment of the present invention, a virtual university 170 comprises student datastore 140, university datastore 145, classroom datastore 150, resources 155, and administration datastore 160.

Student datastore 140 comprises a student record pertaining to each student 100. By way of illustration and not as a limitation, a student record includes classes taken, current class schedule, class performance measures, projected class schedule, personal datastore, and payment datastore.

University datastore 145 comprises information about the virtual university 170. By way of illustration and not as a limitation, such information includes courses offered, news, and a contact directory.

Classroom datastore 150 comprises information relating to a particular course in which a student 100 is enrolled. By way of illustration and not as a limitation, such information includes course assignments, answers to questions, lecture notes, and datastore directed that the performance of each student 100 enrolled in the course.

Resources datastore 155 comprises links to educational resources both inside and outside the virtual university 170.

Administration datastore 160 comprises information relating to the management of the virtual university 170.

Figure 2:
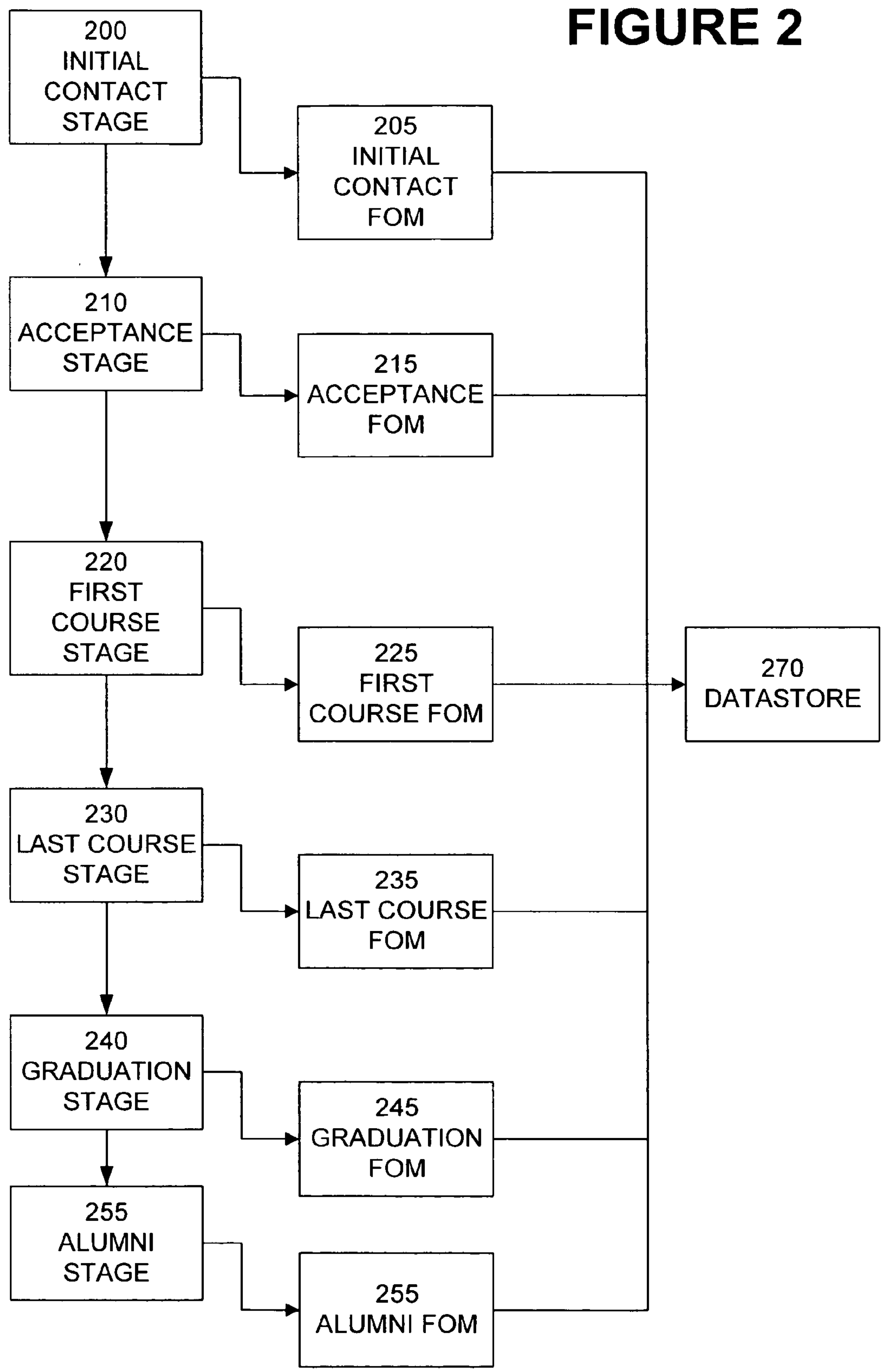
FIG. 2 illustrates a sequence of monitoring stages according to various embodiments of the present invention.

FIG. 2 illustrates a sequence of monitoring stages according to various embodiment of the present inventions. In this embodiment, the relationship between the virtual university and the student starts with the initial contact stage 200, and moves through an acceptance stage 210, a first course stage 220, a last course stage 230, a graduation stage 240, and an alumni stage 250. Each of these stages has a family of measures (FOM) comprising one or more performance metrics that are used to acquire stage information and to gauge the effectiveness of the virtual university programs at that stage. Initial contact FOM 205, acceptance FOM 215, first course FOM 225, last course FOM 235, graduation FOM 245, and alumni FOM are connected to a central datastore 270. The data generated by each FOM is stored in datastore 270. While FIG. 2 illustrates six discrete monitoring stages, the present invention is not so limited. Other monitoring stages may be defined or two monitoring stages combined, without departing from the scope of the present invention.

Figure 3:
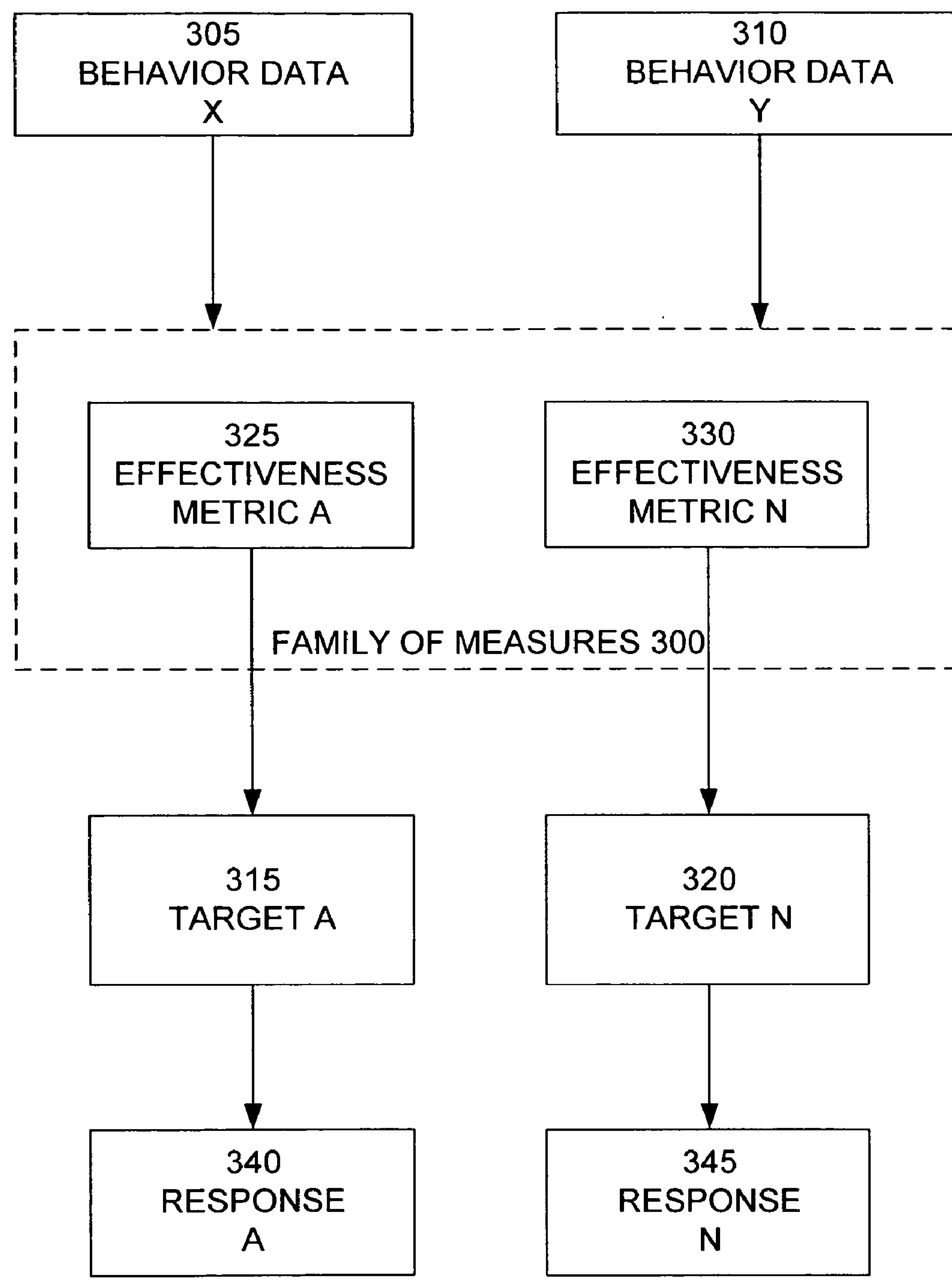
FIG. 3 illustrates the components of an FOM according to an embodiment of the present invention.

FIG. 3 illustrates the generation and application of an FOM according to an embodiment of the present invention. Referring to FIG. 3, FOM 300 receives behavior data X 305 and behavior data Y 310. From these data, effectiveness metric A 325 and an effectiveness metric N 330 are computed. Associated with effectiveness metric A 325 is a target A 315 and associated with effectiveness metric N 330 is a target N 320. A determination is made whether the effective metric A 325 achieves or exceeds the target A. If not, a response A 340 is initiated. Similarly, a determination is made whether the effective measure N 330 achieves or exceeds the target N. If not, a response N 345 is initiated.

Figure 4:
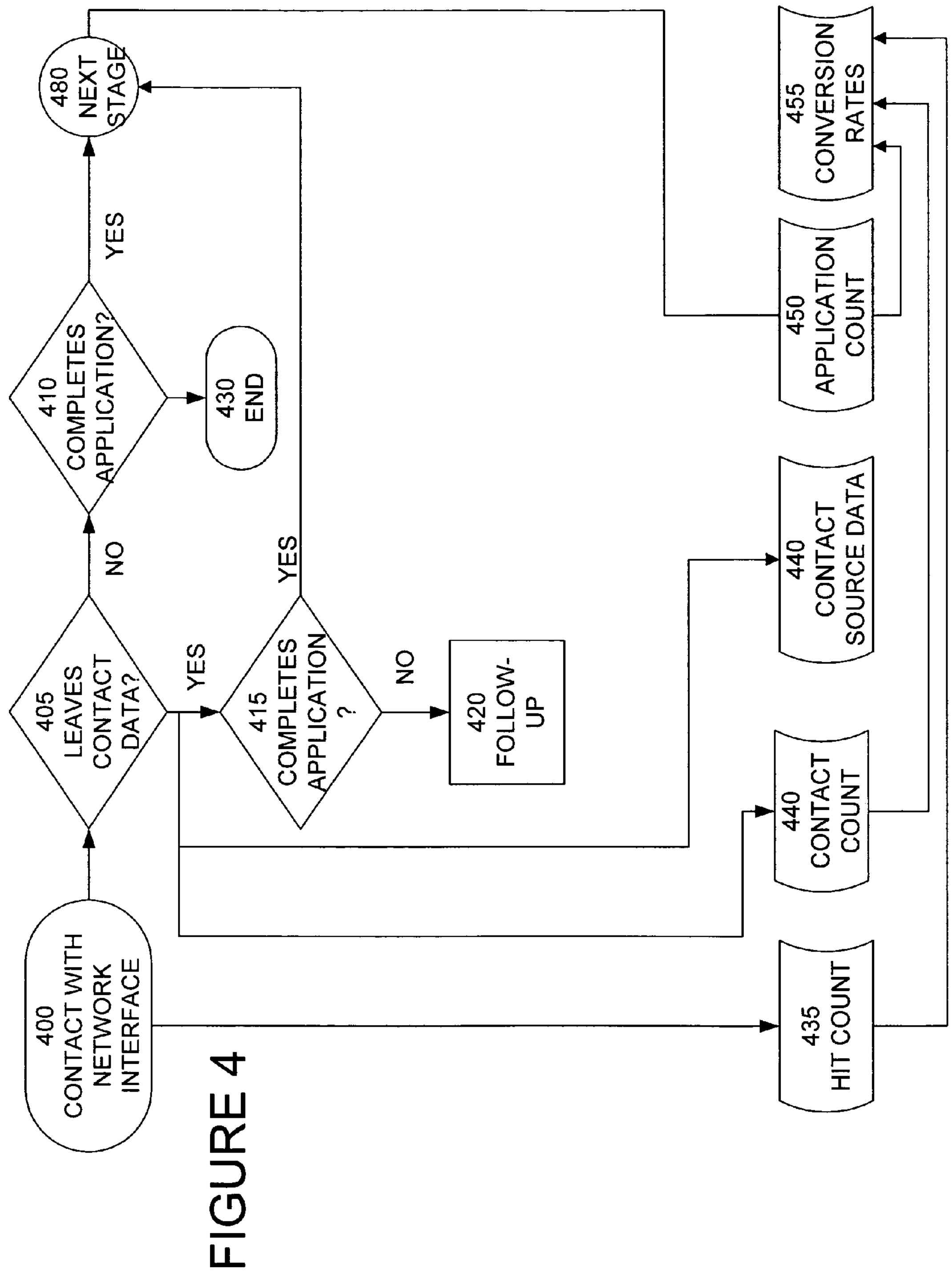
FIG. 4 illustrates a flow diagram of an initial contact stage according to an embodiment of the present invention.

The relationship between a prospective student and a virtual university begins with prospective student's initial contact with the virtual university. FIG. 4 illustrates a flow diagram of an initial contact stage according to an embodiment of the present invention. This contact may be achieved by any means of communication (phone, e-mail, trade show or educational event, etc.). In an embodiment of the present invention, a prospective student enters an initial contact stage by communicating via the network interface 400 with a public information and enrollment server (see FIG. 1, 115). The prospective student decides whether to leave contact data 405. If the prospective leaves contact data, the prospective student may further elect to complete an application 415. A prospective student who elects to leave contact data 405 but not complete an application 415 is flagged for a follow-up procedure 420.

Alternatively, a prospective student may forgo leaving contact data but complete an application 410. Finally, a prospective student may elect to terminate contact with the public information and enrollment server without leaving contact data 405 and without completing an application 410, in which case the process ends 430.

An initial contact stage FOM uses information captured during the initial contact stage to measure stage performance. A hit count register 435 captures the number of unique visitors to the information and enrollment server. A contact count register 440 captures the number of prospective students leaving contact information while a contact source data register 440 captures the location or source of the prospective students, and how each prospective student found out about the virtual university. An application count register 450 captures the number of students completing applications. Conversion rates are determined and captured by a conversion rate register 455.

In an embodiment of the present invention a conversion rate relates the following:

a hit count to a contact count;

a hit count to an application count, and a contact count to the application count.

However, the invention is not so limited. As would be apparent to those skilled in the art, other data may be captured during an initial contact stage and additional conversion rates determined without departing from the scope of the present invention. In an embodiment of the present invention, a datastore (see FIG. 2, 270) receives information from the various registers.

Figure 5:
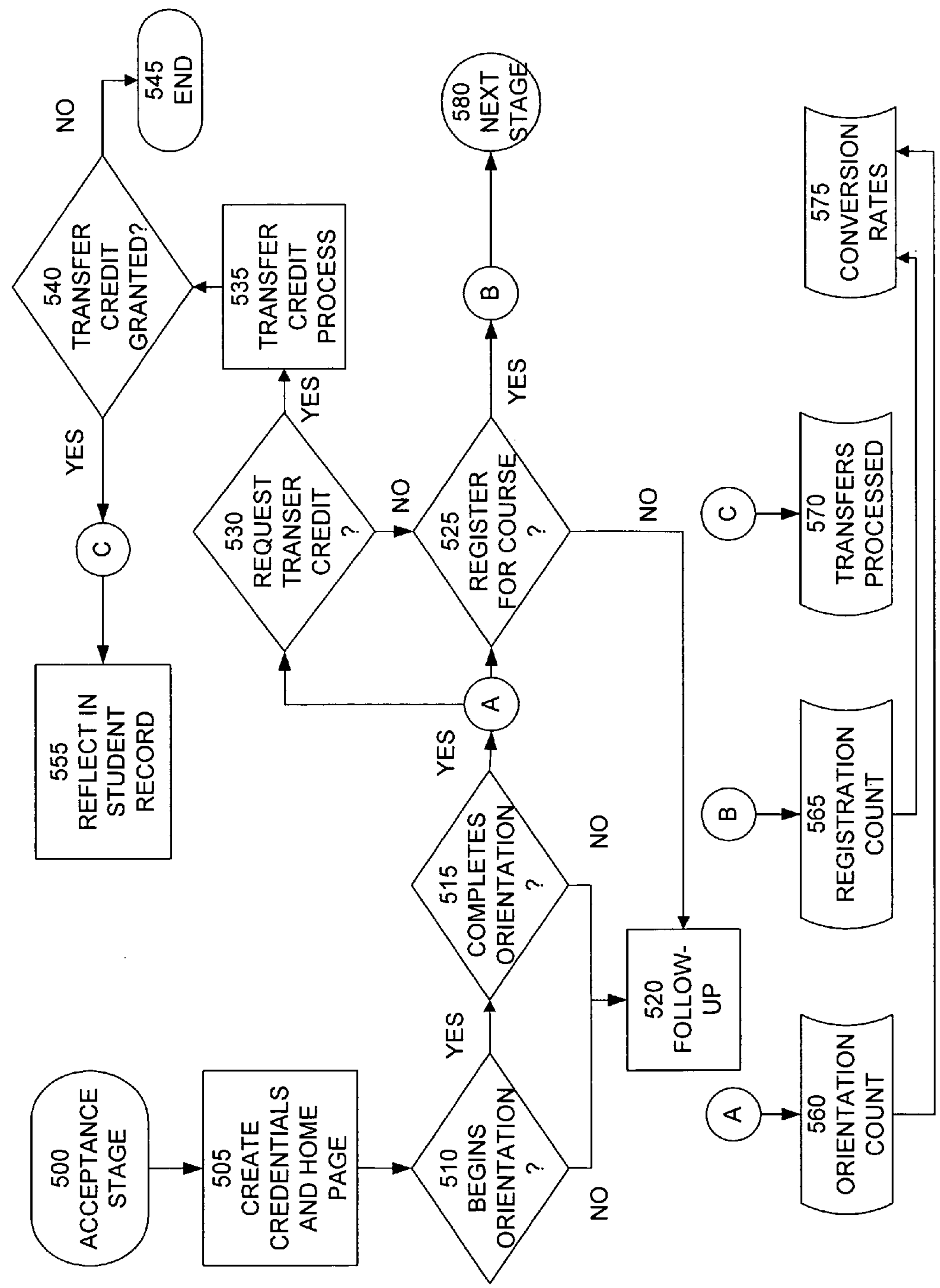
FIG. 5 illustrates a flow diagram of an acceptance stage according to an embodiment of the present invention.

FIG. 5 illustrates a flow diagram of an acceptance stage according to an embodiment of the present invention. Referring to FIG. 5, a prospective student who has completed an application enters an acceptance stage 500. The prospective student creates credentials 505 that allow the prospective student to enter the virtual university. In an embodiment of the present invention, the credentials comprise an ID number and password. The prospective student also creates a student home page 505 from which the student may link to one or more datastores (see FIG. 1).

In another embodiment of the present invention, a prospective student determines whether to begin orientation 510. If the prospective student chooses not to begin orientation, a follow-up procedure 520 is initiated. In an embodiment of the present invention, a student service representative (SSR) follows up on prospective students who fill out an application but do not complete orientation. The SSR typically provides the prospective student more information or assists them with returning to finish the orientation so that they are able to register for their first course. If the prospective student elects to begin registration, the student determines whether to complete registration 515. If the student does not complete registration, a follow-up procedure is initiated 520. If a student completes registration, the student is offered an opportunity to register for a course 525 and an opportunity to request evaluation of transfer credits 530. If a student elects to request evaluation of transfer credits, a transfer credit process 535 is initiated. If the request to grant transfer credits is approved, the transfer credits are reflected in the student record 555. If the request to grant transfer credits is not approved, the transfer credit process ends 545.

If a prospective student registers for a course, the prospective student is granted admission to the virtual university and enters the next stage 580. If the prospective student does not register for a course, a follow-up procedure is initiated 520.

Each time a student registers for a course he or she must elect some form of payment. Students may pay by credit card and have the option of deferring payment throughout the semester session using an automatic debit plan. Additionally, students may use education loans as payment. A student who is a member of the military may use military tuition assistance (TA). In an embodiment of the present invention, the virtual university may offer financial assistance in the form of scholarships. Whatever the means of payment, a reminder is displayed on the student's student home page prior to the date when payment for a course or other charges due. In still another embodiment of the present invention, the student may request to transfer class credits from another institution. New students who have completed previous work at other institutions are directed to apply for transfer credit during orientation. A request to transfer credits initiates a transfer credit evaluation process. Upon completion of the transfer credit evaluation process, the student is notified whether the transfer request has been granted.

In another embodiment of the present invention, after a new student registers for a course and completes payment, books are automatically ordered and shipped to the student via a book ordering system. The virtual university collates undergraduate course registrations and sends a booklist to one or more vendors for shipment to the students. In another embodiment, the virtual university provides links to an online book resource that stocks all the virtual university's courses materials.

An acceptance stage FOM uses information captured during the acceptance stage to measure stage performance. An orientation count register 560 captures the number of prospective students completing orientation (data point A). A registration count register 565 captures the number of prospective students registering for a class. A transfers process register 570 captures the number of transfer credit requests processed over a period of time.

Conversion rates are determined and captured by a conversion rate register 575. In an embodiment of the present invention, a conversion rate is established to relate the following:

- a number of applications received to the number of prospective students that progress to orientation;
- a number of prospective students who initiate orientation and progress to registration; and
- a number of applications to the number of prospective students that complete registration.

Figure 28B:
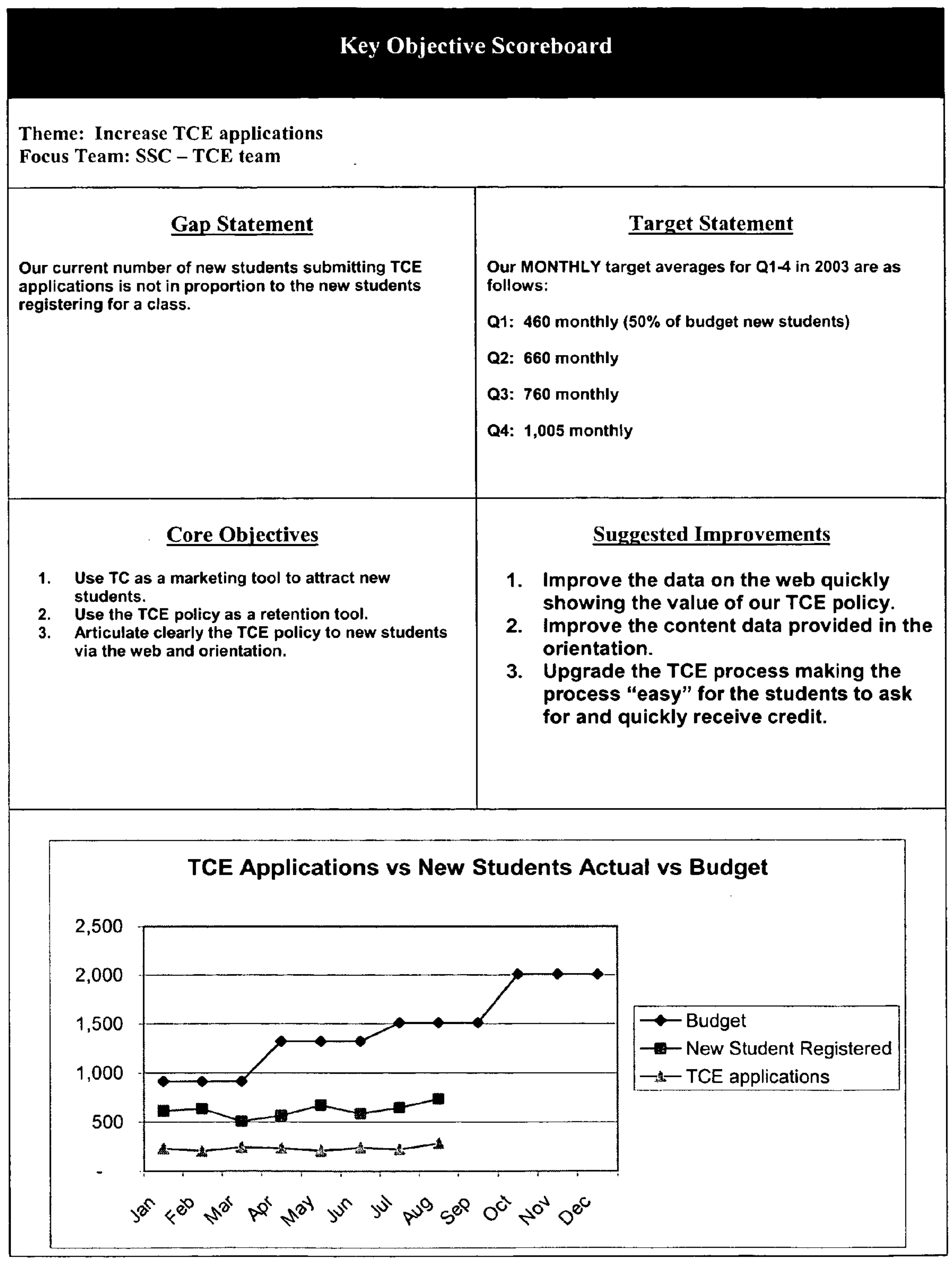
Figure 28C:
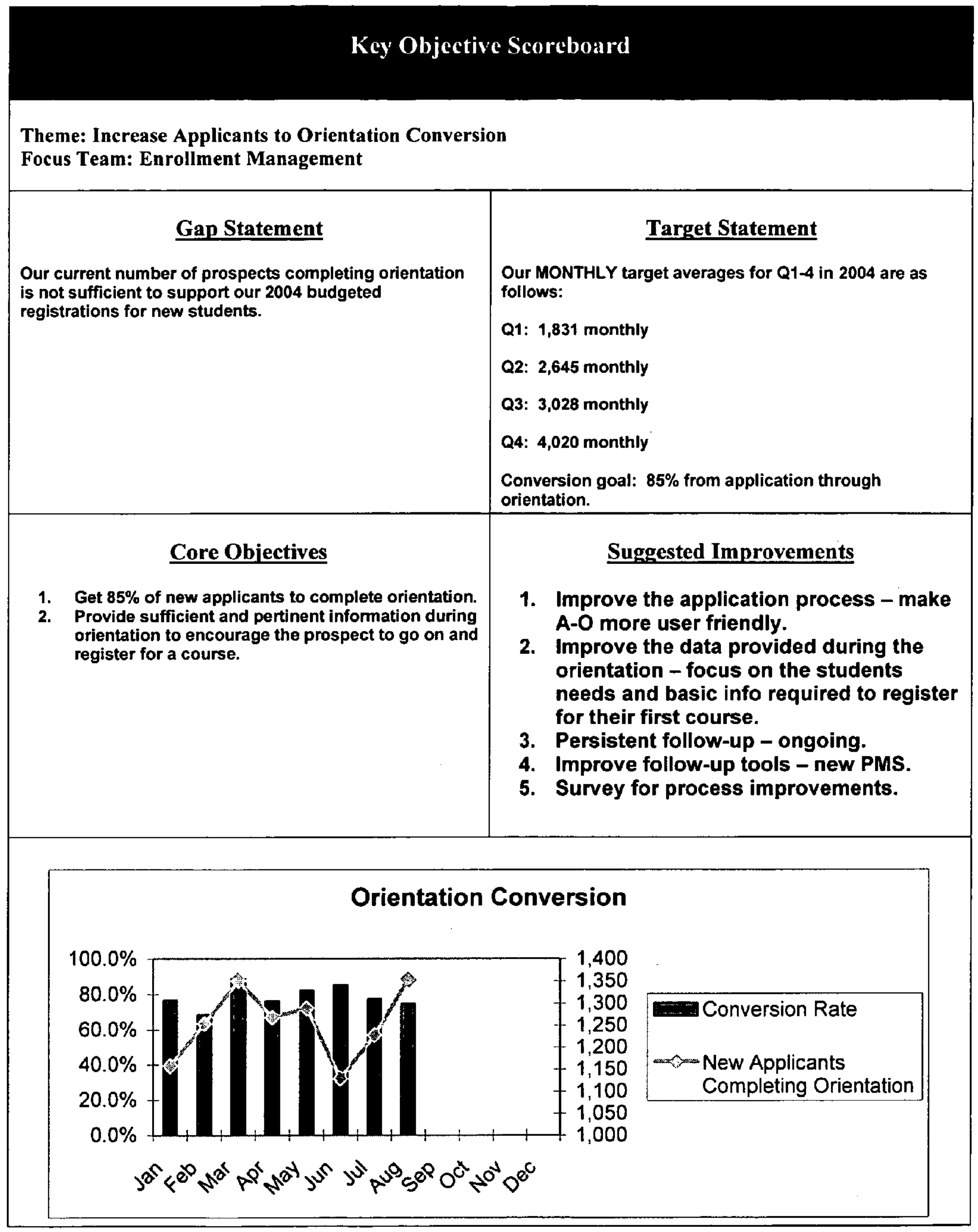
Figure 28D:
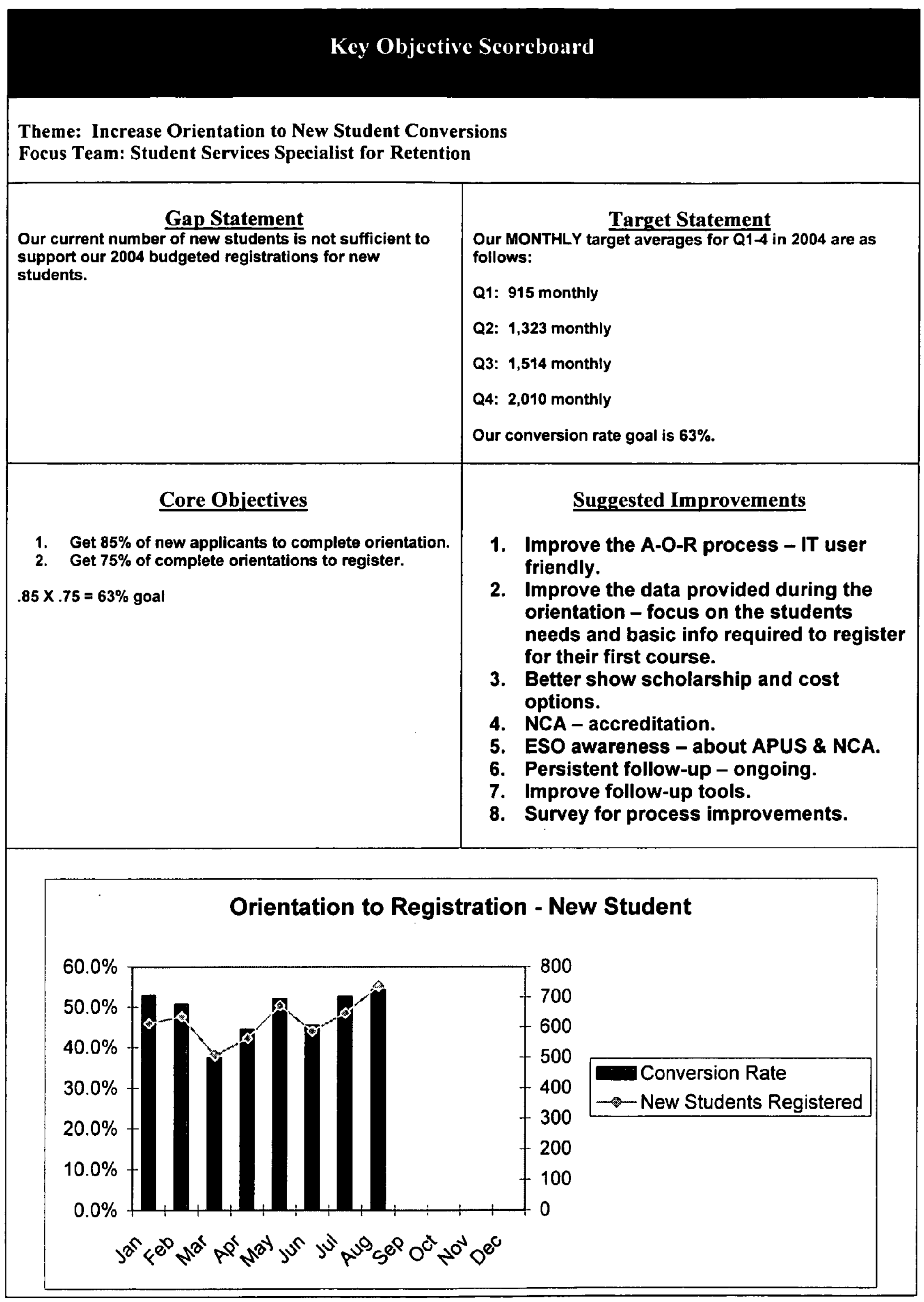
Figure 28E:
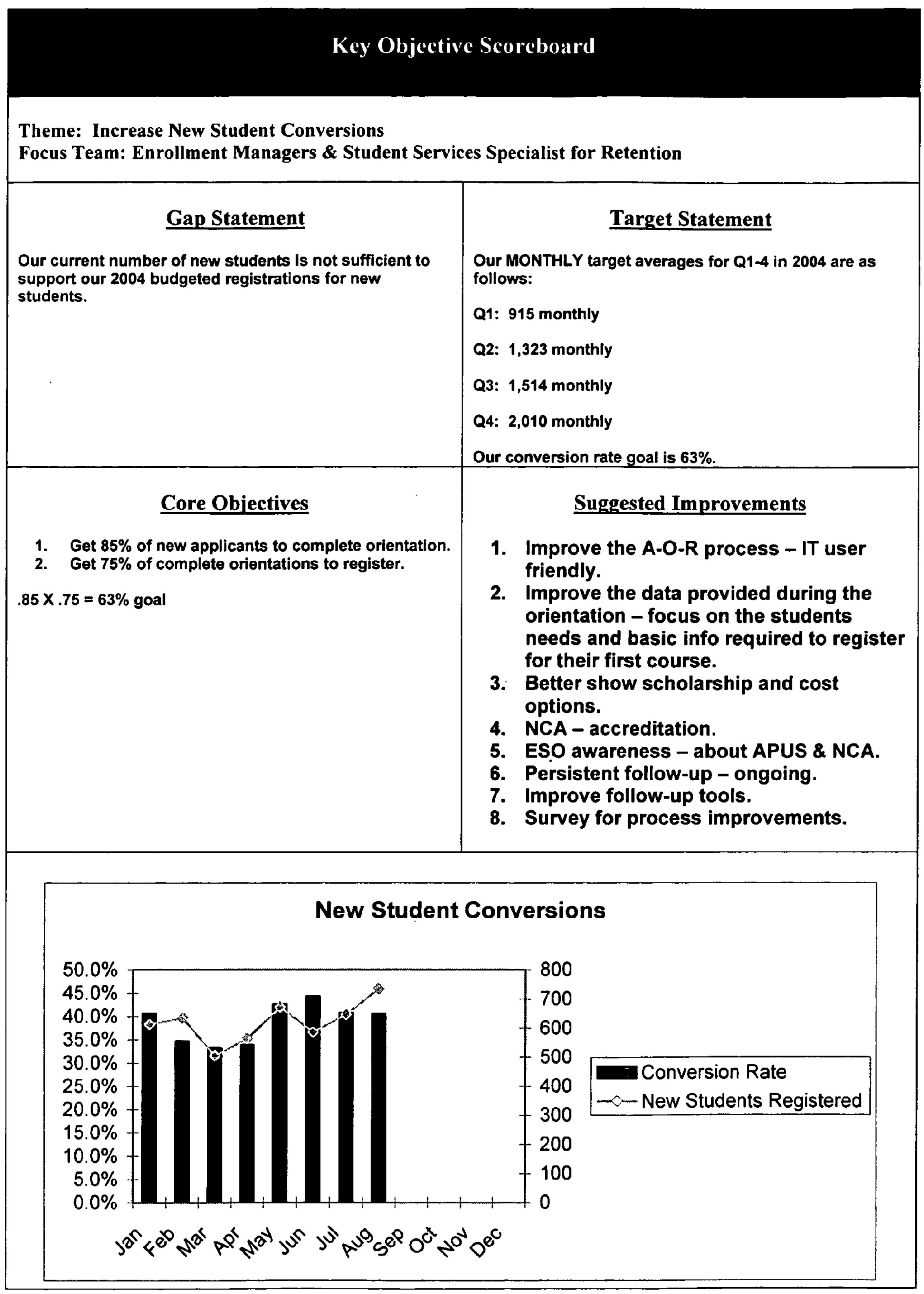
Figure 28F:
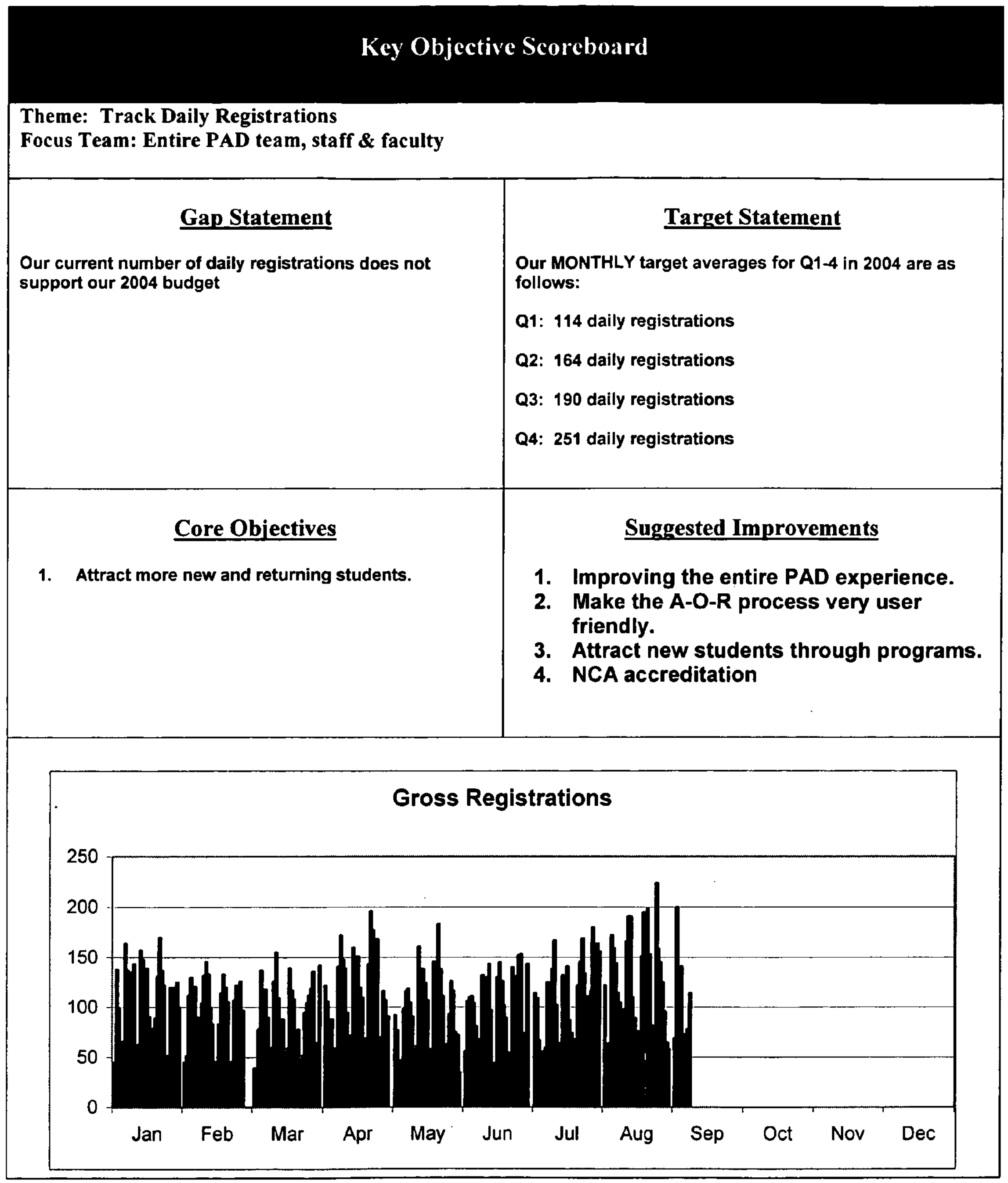

The FOM data thus collected can be used to produce reports related to desired objectives or "Key Objective Scoreboards," as illustrated in FIGS. 28B-F, wherein FIG. 28B is an exemplary Key Objective Scoreboard drawn to increasing Transfer Credit Evaluation (TCE) applications, FIG. 28C is an exemplary Key Objective Scoreboard drawn to increasing the applicant to orientation conversion rate, FIG. 28D is an exemplary Key Objective Scoreboard drawn to orientation to new student conversions, FIG. 28E is an exemplary Key Objective Scoreboard drawn to increasing new student conversions, and FIG. 28F is an exemplary Key Objective Scoreboard drawn to the tracking of daily registrations.

However, the invention is not so limited. As would be apparent to those skilled in the art, other data may be captured during the acceptance stage and additional conversion rates determined without departing from the scope of the present invention. By way of illustrations and not as a limitation, data regarding courses dropped and the reasons why, the number of scholarships awarded, and the delivery time for undergraduate book shipments may be captured.

In still another embodiment of the present invention, a Student Satisfaction Quotient (SSQ) measures the effectiveness of the virtual university in providing for students from the student perspective. The SSQ is used by the virtual university in conjunction with student complaints and suggestions to develop corrective measures to strengthen the relationship between the virtual university and the student.

Figure 6:
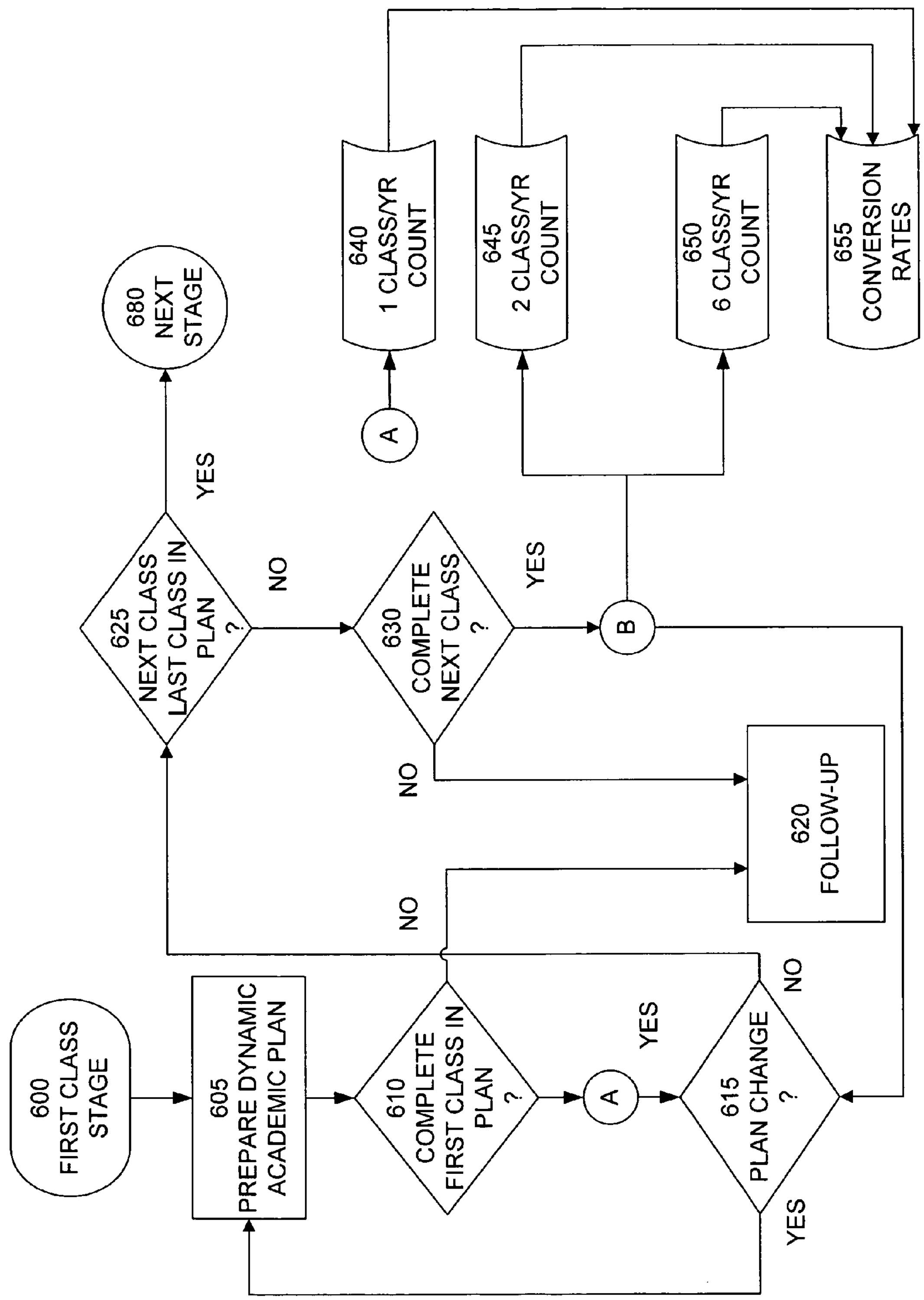
FIG. 6 illustrates a flow diagram of a first course stage according to an embodiment of the present invention.

A student enters the first course stage when the student registers for his or her first online course and leaves the first course stage when the student registers for his or her last course. FIG. 6 illustrates a flow diagram of a first course stage according to an embodiment of the present invention. Referring to FIG. 6, a student who has completed registration for a first class enters a first course stage 600. The prospective student creates a dynamic academic plan 605 that establishes the student's academic goals and maps course offerings to allow that student to achieve those goals. The dynamic academic plan accounts for any transfer credits granted the student. If the student completes the first class in the dynamic academic plan 610, the student is given an opportunity to change the dynamic academic plan 615. If the student does not complete the first class in the dynamic academic plan, a follow-up process is initiated 620. If the student decides to change the dynamic academic plan, the student again prepares a dynamic academic plan 605. The revised dynamic academic plan accounts for transfer credits that may have been granted to the student, and if applicable, the first class taken by the student.

If the student chooses to proceed with the dynamic academic plan, a determination is made whether the next class in the dynamic academic plan is the last class in the dynamic academic plan 625. If the next class is the last class the student proceeds to the next stage 680. If the next class is not the last class in the dynamic academic plan, the student proceeds to the next class 630. If the student does not complete the next class, a follow-up process is initiated 620. If the student completes the next class, the student is given an opportunity to change the dynamic academic plan 615. This process continues until the student ceases to take classes or the next class is the last class.

A first course stage FOM uses information captured during the first course stage to measure stage performance. A one class per year count register 640 captures the number of prospective students completing a single class in a twelve-month period (a year). A two class per year count register 645 captures the number of prospective students completing two classes in a year. A six class per year count register 650 captures the number of prospective students completing six classes in a year.

Conversion rates are determined and captured by a conversion rate register 655. In an embodiment of the present invention, a conversion rate is established to relate the following:

- a number of students completing one class in a year to the number of students taking classes;
- a number of students completing 2 classes in a year to the number of students taking classes; and
- a number of students completing six classes in a year to the number of students taking classes.

As illustrated in FIG. 28A, an exemplary Key Objective Scoreboard can be produced related to student retention based upon the tracked data, such as the number of courses taken.

However, the invention is not so limited. As would be apparent to those skilled in the art, other data may be captured during the acceptance stage and additional conversion rates determined without departing from the scope of the present invention. By way of illustrations and not as a limitation, data may be captured from the first class stage to determine a first course completion rate and the number and/or rate of students who passed, failed, dropped, or withdrew from a course. In another embodiment of the present invention, an interactivity quotient in the classroom is determined by tracking how many students signed in on time for a class, the completion rate of homework assign assignments, and whether grades were posted in a timely manner.

Throughout the first class stage, a student is monitored to ensure that he or she received any assistance they need to fulfill their academic goals and reach program completion. Degree-seeking students are tracked to ensure they meet their graduation deadline. The major role players vital to this process are faculty, staff, peers, alumni, and the website. The opportunities for all of these players to "touch" and assist a student are numerous. A student may need help navigating through the learning process at any time.

In an embodiment of the present invention, interactions between prospective students and the virtual university are monitored through the acceptance stage and interactions between students and the virtual university are monitored from the acceptance stage forward.

In an embodiment of the present invention, a touch point comprises an event that triggers a response. The nature of a response is determined by the event that triggers it. By way of illustration, during the acceptance stage (see FIG. 4), if a prospective student leaves contact data, an acknowledgement response is generated. If it is detected that a student does not complete a class in an academic plan (see FIG. 6), an academic counseling response is triggered. If a student does not respond to an academic counseling response, a follow-up response is triggered. As will be apparent to those skilled in the art, other events may trigger additional responses. For example, and not as a limitation, a motivational response may be sent upon the successful completion of a class or upon reaching certain milestones toward completing an academic plan. An informational response may be sent to announce a new class offering, a new academic resource, or a change in a policy of the virtual university. In addition, a survey response may be sent to a student completing a set number of courses or achieving threshold tenure with the virtual university.

The dynamic academic plan is not only used by students to progress toward a stated academic goal, but provides the virtual university data needed to constantly monitor resource requirements on a prospective basis. In an embodiment of the present invention, the dynamic academic plan of all students enrolled in a virtual university are compiled to provide a time-based dynamic resource allocation plan. By way of illustration and not as a limitation, at a point in time, a dynamic resource allocation plan provides the classes that have been scheduled by the student body, and the classes that are projected to be scheduled at points in time in the future. Because a student may change his or her dynamic academic plan at any time, the dynamic resource allocation plan is also in flux, but is in sync with the prospective needs of the student body.

Figure 7:
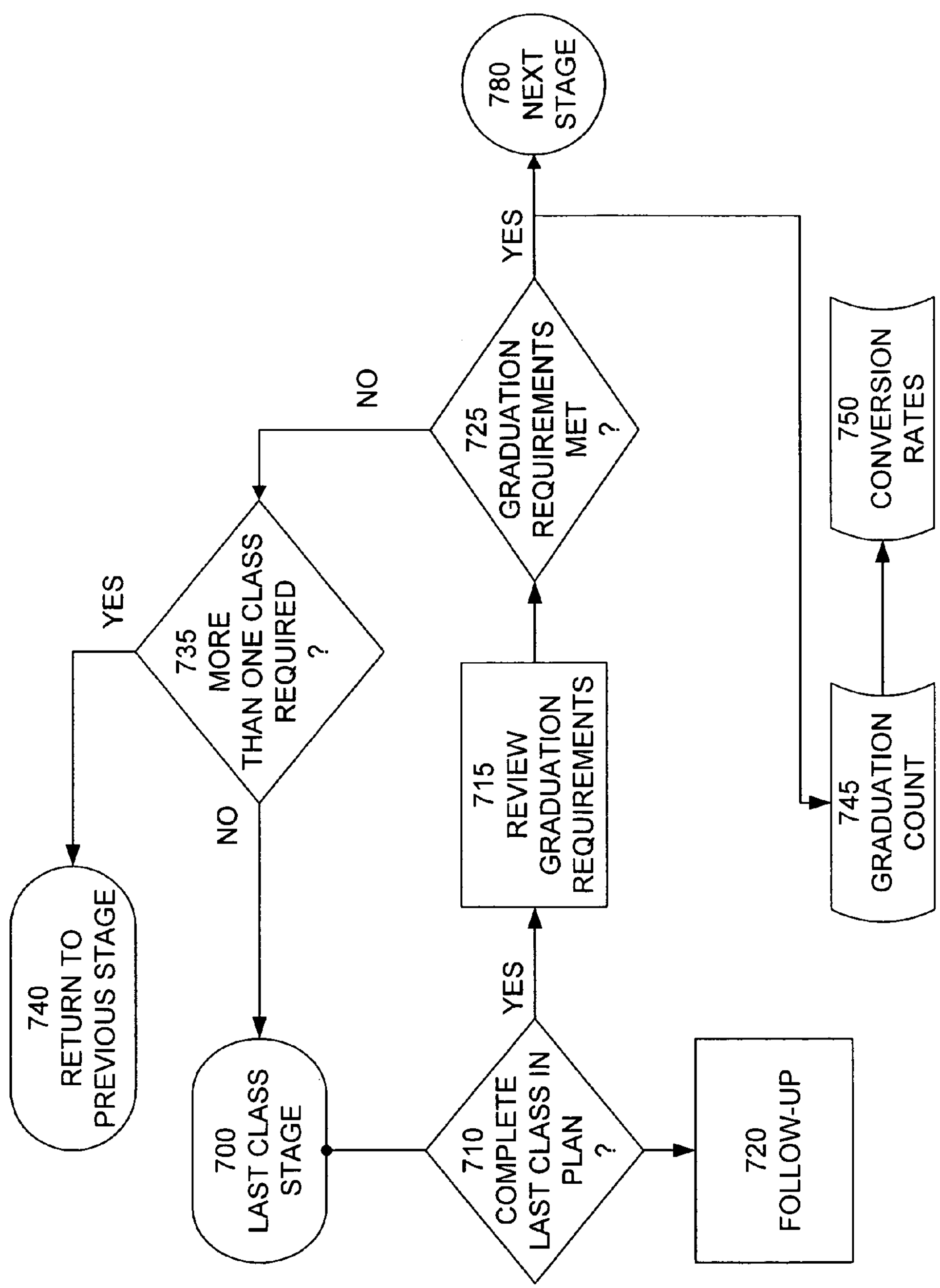
FIG. 7 illustrates a flow diagram of last course stage according to an embodiment of the present invention.

FIG. 7 illustrates a flow diagram of the last course stage according to an embodiment of the present invention. A student enters the last course stage when he or she registers for the last course required for degree or program completion. This registration is much like any other registration with the additional requirement that the student submits a graduation application form. Each graduating student is asked to complete a formal survey that directed to the student's experience with the virtual university.

Referring to FIG. 7, a student who has registered for his or her last class enters the last class stage 700. If the student completes the last class in an academic plan 710, a review of the graduation requirements 715 is initiated. If the student does not complete the last class in an academic plan, a follow-up procedure is initiated 720. If the graduation requirements are not met, a determination is made as to whether more than one class is required for graduation 735. If only one class is required for graduation, the student re-enters the last class stage 700. If more than one class is required for graduation, the student re-enters the previous stage 740.

A last course stage FOM uses information captured during the last course stage to measure stage performance. A graduation count register 745 captures the number of students fulfilling the requirements for graduation 745. Conversion rates are determined and captured by a conversion rate register 750. In an embodiment of the present invention, a conversion rate is established to relate the following:

- a number of students entering the virtual university to the number that graduate;
- a number of students entering a particular degree program to the number of students in that degree program that graduate; and
- a number of students who enter a degree program to the number that fail to complete the last class to qualify for the degree.

However, the invention is not so limited. As would be apparent to those skilled in the art, other data may be captured during the acceptance stage and additional conversion rates determined without departing from the scope of the present invention. By way of illustrations and not as a limitation, the grades of graduates may be captured in a grade register and related to demographic data of those students.

A student enters the graduation stage upon completion of the last course necessary for a degree. A student can elect to attend a commencement ceremony, plan to have their diploma presented by an official of their own choice at their own location, or opt to have no ceremony at all. A graduation FOM is used to calculate the effectiveness of the virtual university via graduation rates, which are measured by cohort, degree and program of study.

A student enters the alumni stage upon degree completion. After their degree completion, alumni are sent a survey that focuses on their learning outcomes and the applicability of their academic experience to their work place. The alumni are also asked to provide the names of their current managers who are surveyed to determine the effectiveness of the alumni's course of study on his or her performance. The virtual university's alumni are then surveyed every two-years and the information is studied as a part of the virtual university's improvement process.

The alumni stage FOMs are used to determine the effectiveness of alumni mentoring via the numbers of alumni actively involved in alumni programs and the numbers of alumni mentors.

WORKING EXAMPLE

Figure 27:
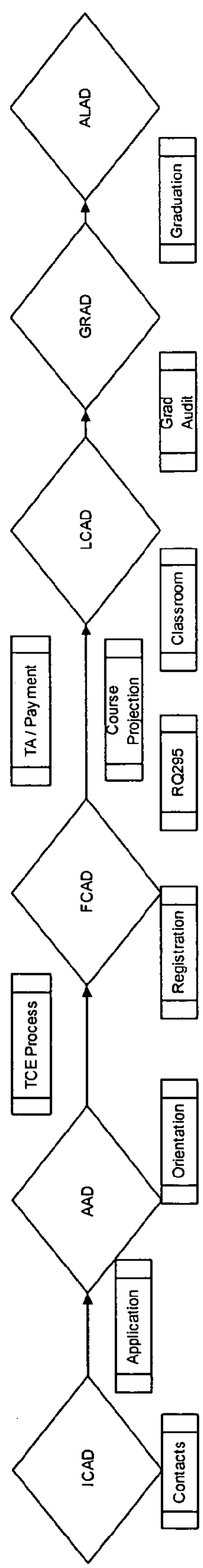
FIG. 27 illustrates a flow diagram of an exemplary Partnership At a Distance (PAD) process according to an embodiment of the present invention.

A working example of an embodiment of the present invention can be found in the present inventors' "Partnership At a Distance" program. An overall diagram of the process is illustrated in FIG. 27, the details of which are discussed further, below.

The first five Partnership At a Distance (PAD) diagrams, FIGS. 8-12, portray a process flow from the student perspective. As shown in FIG. 27, this flow starts with ICAD (Initial Contact At a Distance), and moves through AAD (Acceptance At a Distance), FCAD (First Course At a Distance), LCAD (Last Course At a Distance), GRAD (Graduation At a Distance), and finally ALAD (Alumni At a Distance). FIGS. 13-16 portray the process flow from the faculty perspective, from initial contact (ICAD) to teaching the first course (FCAD).

At the bottom of each of FIGS. 8-12 is a Family of Measures (FOM) used by the staff to quantify objectively the effectiveness and strength of the partnership. Areas not indicative of a desired partnership with the student are quickly identified and become the focus for process improvement. The Student Satisfaction Quotient (SSQ) is part of the FOM that allows the system (referred to a APUS in the figures) to measure its performance from the student perspective. The owners of the many processes supporting PAD are also depicted at the bottom of each of FIGS. 8-12.

Figure 8:
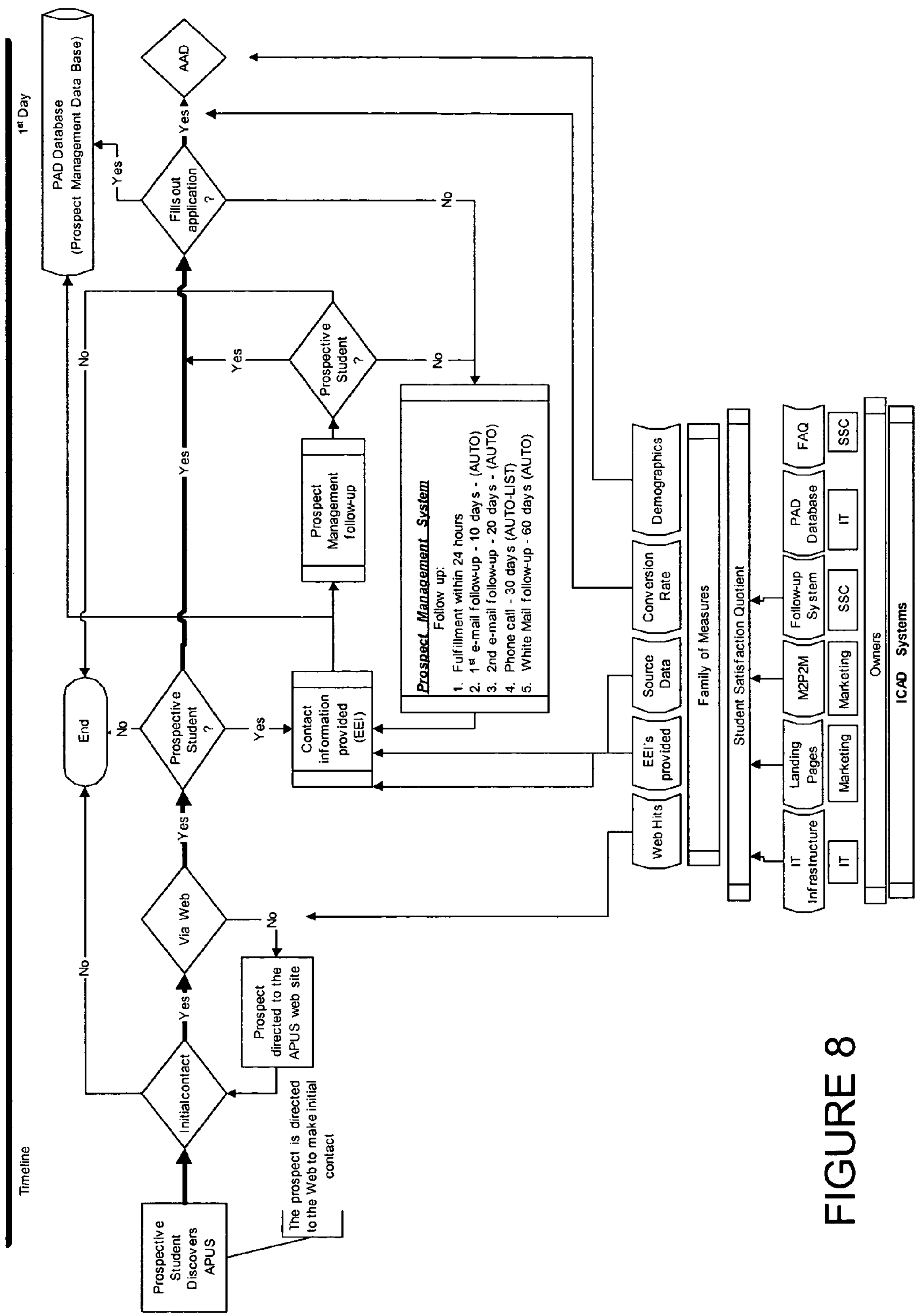
FIG. 8 a flow diagram of an exemplary student Initial Contact At a Distance (ICAD) process according to an embodiment of the present invention.

As illustrated in FIG. 8, the Partnership begins with prospective student's Initial Contact At a Distance (ICAD) by any means of communication (phone, e-mail, trade show or educational event, etc.). The goal is to direct all individuals to the system web site so as to attempt to partner with them at a distance throughout the individual's learning experience. Prospective students have the option of filling out an admissions application, submitting a request for more information, or leaving the web without a trace and ending the system's contact with them. Those who request more information are asked to provide Essential Elements of Information (EEI) so that the system's Enrollment (aka, Prospect) Management Department is able to determine their degree or program of interest and contact them for assistance. These EEIs provide sufficient information to properly initiate the partnership.

Figure 19:
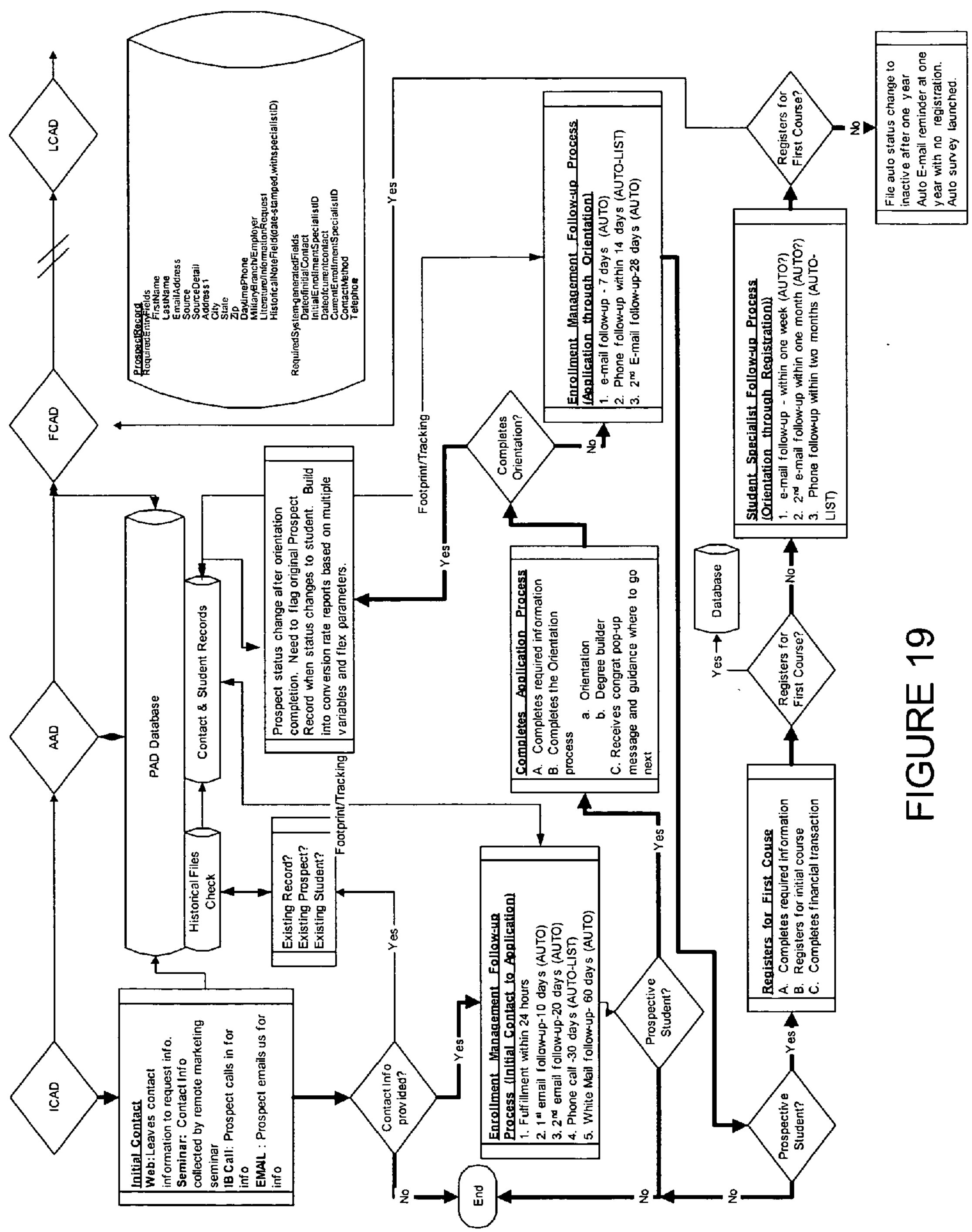
FIG. 19 illustrates a flow diagram of an exemplary enrollment management and student follow-up process according to an embodiment of the present invention.

The Enrollment Management and Student Follow-up process flow is illustrated in more detail in FIG. 19. The Enrollment Management Department follows up on prospective students who leave contact information. Enrollment Management Specialists (EMSs) send e-mails and contact these individuals by phone to provide more information and/or links to various subject and program locations on the website. The follow-up to these prospective students also includes e-mails auto-generated from our system. Initial Contact At a Distance ends when the student submits the online application. The ICAD Family of Measures (FOM) captures the number of unique web visitors, the number of prospective students leaving contact information, the location or source of the prospective students, and how they found out about the system. The FOM also monitors the conversion rate from visiting the web to leaving contact information to filling out applications. With this data the system is able to measure and strengthen its partnership with the prospective student during ICAD.

The Prospect Management database is a sub-component of the PAD database and allows the student to be tracked from ICAD through graduation. This valuable information is sent to the Programs and Marketing Department and used to better focus on those prospective students who have the desire and motivation to progress through the learning experience.

Figure 9:
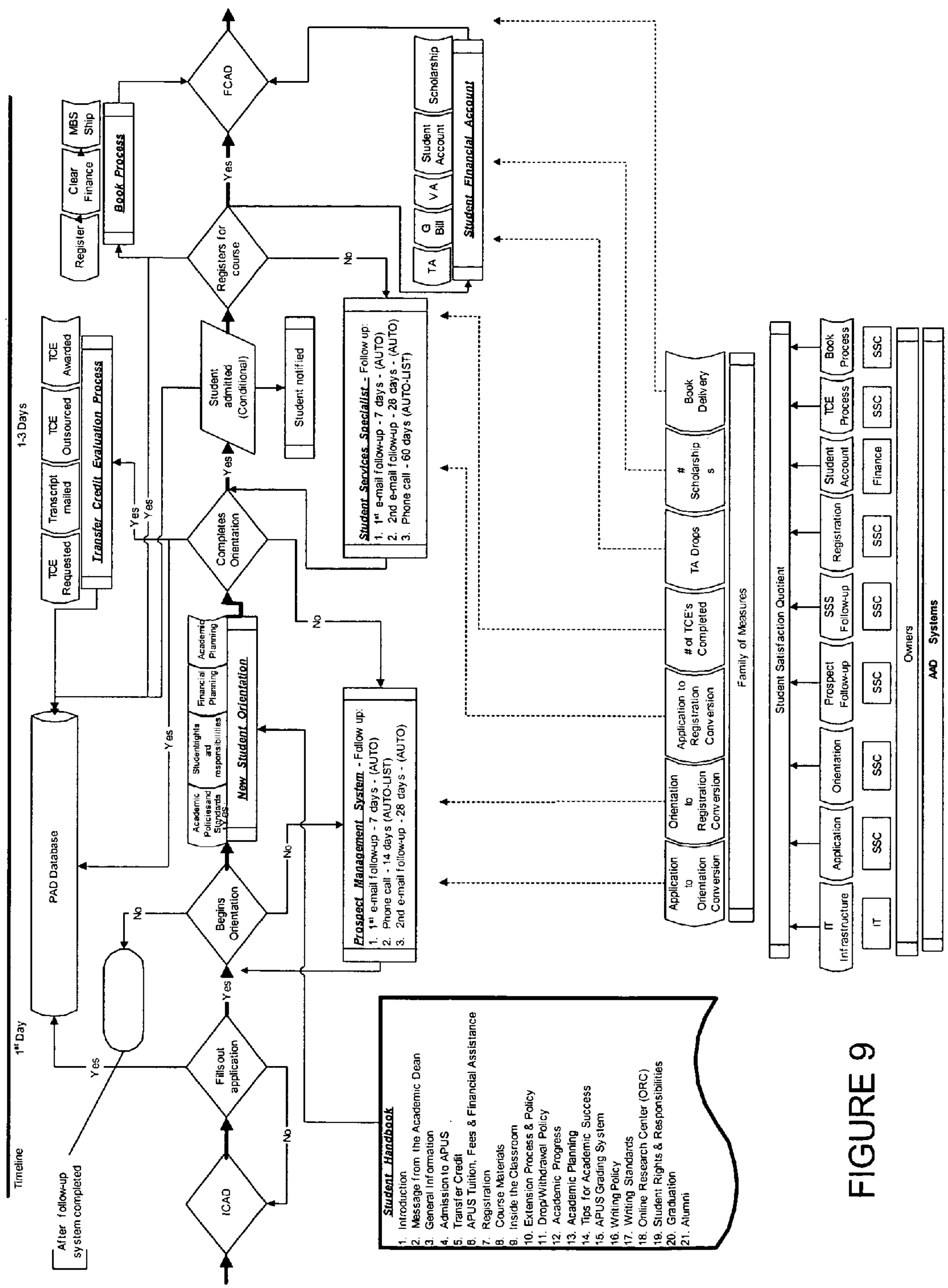
FIG. 9 a flow diagram of an exemplary student Acceptance At a Distance (AAD) process according to an embodiment of the present invention.

The second step in the partnership with the student is AAD (Acceptance At a Distance), as illustrated in FIG. 9. It begins when the student completes the application and Orientation. It ends when the student is accepted under a conditionally admitted status.

Upon submitting a completed online application, the new applicant creates an ID number and password to gain immediate access to the system's online orientation. This ID and password also gives the applicant the ability to save the application if s/he must leave the site and return later to complete the Orientation.

Orientation requires approximately 40-60 minutes to complete and focuses on four areas vital for new students to understand before they progress further into their partnership with the system: Academic Policies and Standards, Student Rights and Responsibilities, Financial Planning, and Academic Planning. The student signs off to acknowledge an understanding of the data as s/he completes each of the first three sections. During the fourth section the student declares his/her degree. Although the student is not able to return to the orientation once it is completed, the online Student Handbook is provided inside each campus as a reference for each topic covered.

The Academic Policies and Standards section introduces the student to important data about admission statuses, documents required for full admission, transfer credit evaluation, course extension and withdrawal, and institutional requirements. The Student Rights and Responsibilities section teaches the student about what is expected regarding attendance and professor contact, how to access online information, and how to use course projection. It also informs the student of privacy rights and the system's writing and plagiarism policies. The Financial Planning section covers tuition and fees, payment options, scholarships, loans, and the refund policy. Finally, the Academic Planning section guides the student through the process of declaring his or her intent to pursue a degree or certificate program via an online academic program builder.

To complete Orientation, the student must declare an academic goal. In order to do this, the student is led through an academic program builder where s/he declares a degree or non-degree program: Associate's, Bachelor's, Master's, undergraduate or graduate Certificate or Short Professional Program (SPP). The student may also declare a major and/or concentration. Upon submitting a final choice, the system 'builds' an academic program for the student and presents a comprehensive list of courses required for graduation or completion of the declared program.

After completing Orientation, the student may refer to the Student Handbook for assistance and guidance on all the system's policies, processes, and procedures. It is accessible from both inside and outside of the electronic campus and is considered the primary reference for answers to questions about financial aid, tuition assistance, refunds, registration, course drop/withdrawal, course extension, the system's grading policies, making successful academic progress, and student rights and responsibilities.

Enrollment Management Specialist's also follow up on prospective students who fill out an application but do not complete Orientation. The EMSs contact them by phone or individual e-mail to provide more information or assist them with returning to finish the Orientation so that they are able to register for their first course. The follow-up to these students also includes system-generated e-mails.

All applicants who complete Orientation are granted conditional admission to the system and notified of their status by an auto-generated e-mail. Although the system does not charge a fee for the application-orientation process, students must "pay" with their commitment and time by completing the Orientation, as they are not conditionally accepted until they have done so. After they have submitted all necessary official admissions documents, their admission requirements and admission status are reviewed for "full acceptance."

A Student Services Specialist (SSS) follows up with students who completed the Orientation and academic program builder but did not register for an initial course. The SSS contacts these new students by e-mail and/or phone to provide more information or guide them through their first online registration. The follow-up to these new students also includes system-generated e-mails.

Each time a student registers for a course s/he must elect some form of payment. Students may pay by credit card and have the option of deferring payment throughout the semester session using the system's automatic debit plan (ADP). Some students also use education loans as payment. Most of the students in the military use military tuition assistance (TA), which generally pays for 4-6 courses a year. Students using various forms of tuition assistance will see flags placed on their registration web page to remind them when payment for the course is due. All students have the ability to view their student account at any time and contact the Finance Office by e-mail or phone with any questions and/or concerns.

Figure 20:
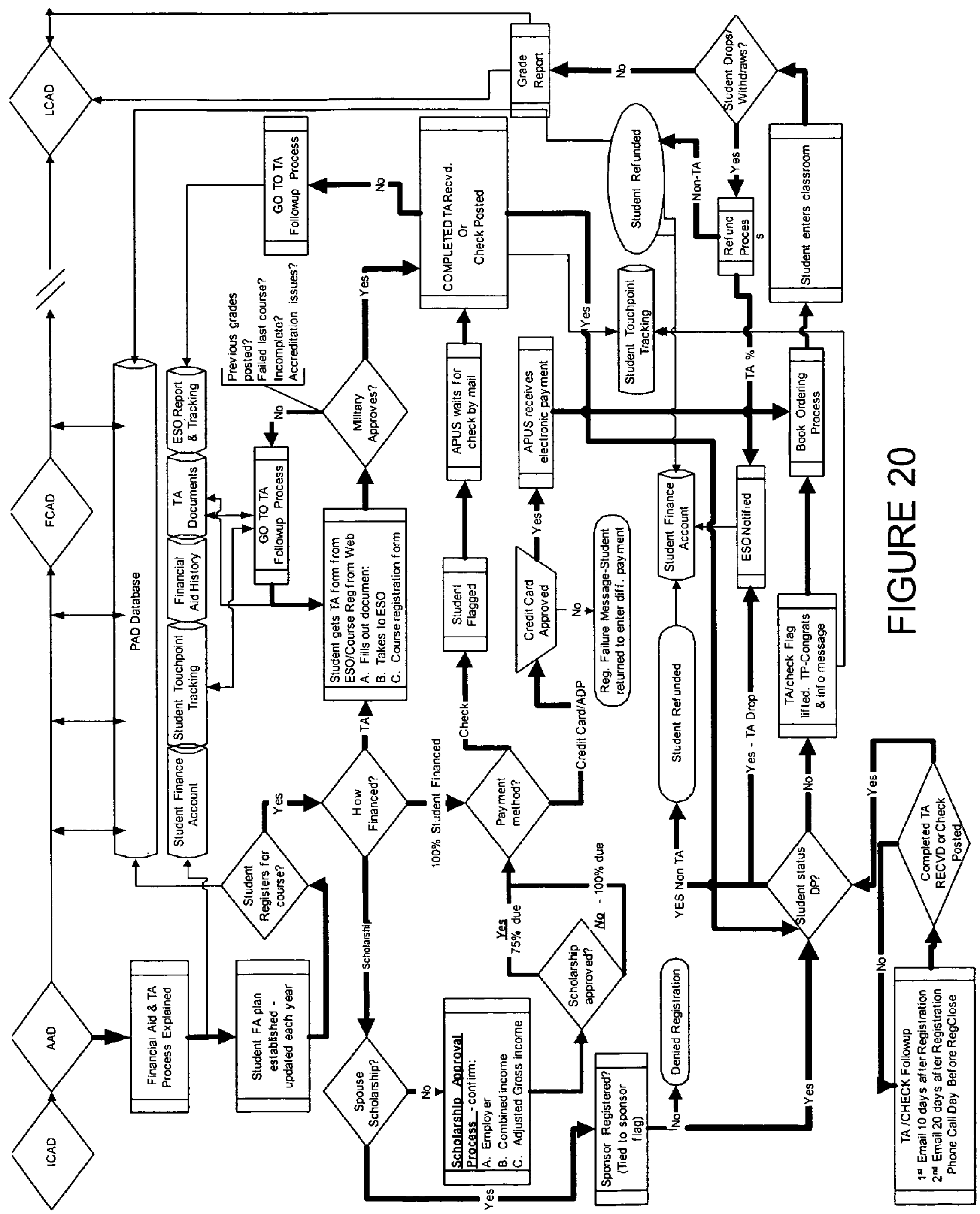
FIG. 20 illustrates a flow diagram of an exemplary financial payment and tuition assistance process according to an embodiment of the present invention.

In the present working example, the system offers several scholarships. The ASIS (American Society of Industrial Security) International scholarship is open to all current, active members of that society. The Military Spouse Scholarship is open to the eligible spouses of active system students in the military. The University Scholarship is awarded to eligible degree-seeking undergraduate students, but they may not combine it with any other form of financial assistance. A more detailed diagram of the financial payment and tuition assistance process flow is illustrated in FIG. 20.

For many new students, another important aspect of AAD is Transfer Credit Evaluation (TCE). New students who have completed previous work at other institutions (referred to as "Transfer students") are directed to apply for transfer credit during Orientation.

Figure 18:
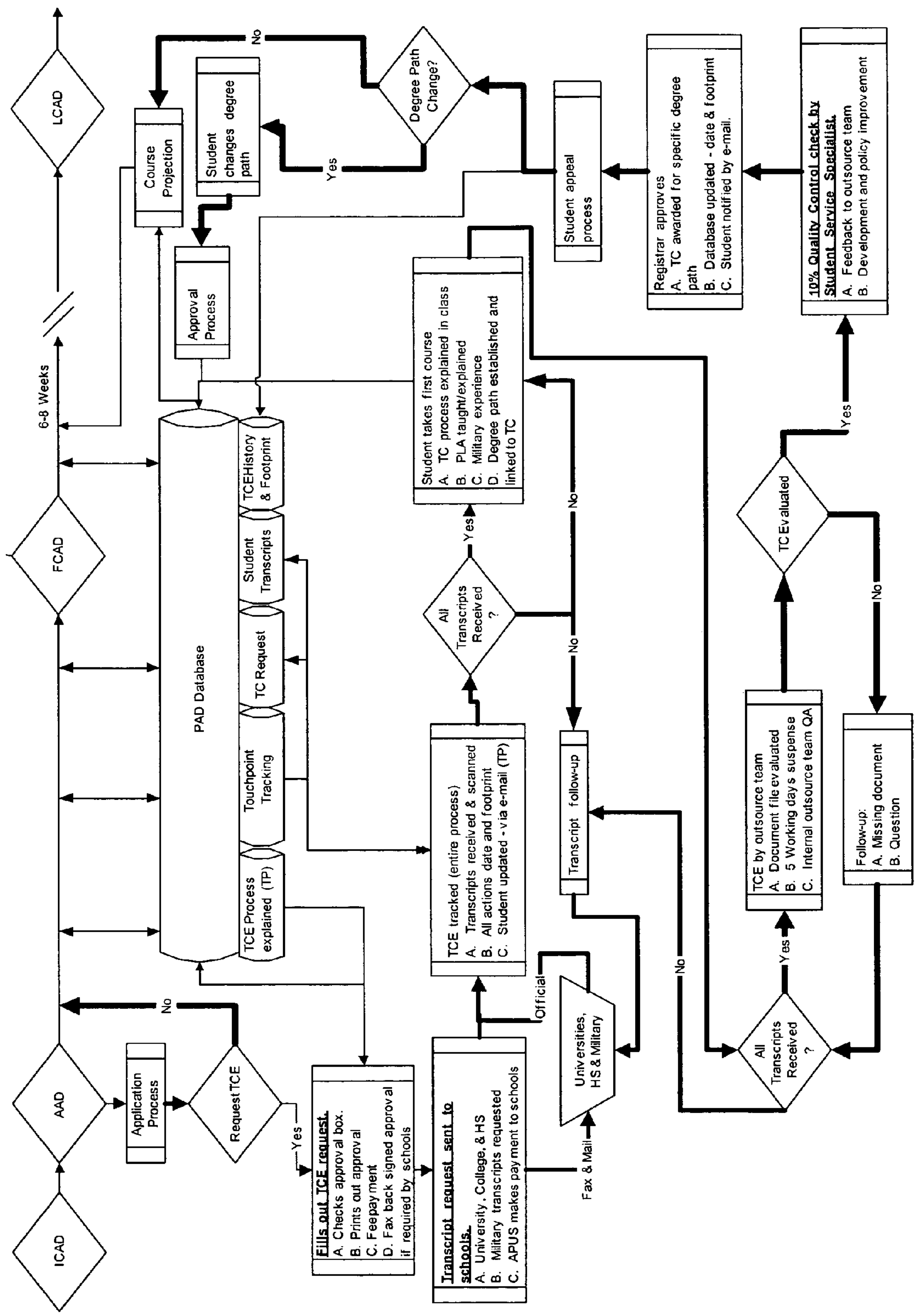
FIG. 18 illustrates a flow diagram of an exemplary transfer credit evaluation process according to an embodiment of the present invention.

The transfer credit evaluation (TCE) process takes about 6-8 weeks to complete. It includes completing and submitting a TCE application and paying a one-time fee of $75, regardless of the number of transcripts submitted for evaluation. Students must also give the system the authority to request their official transcripts from all previous institutions attended. Once the completed TCE application, payment, and all transcripts have arrived at the system, a Transfer Credit Evaluator will thoroughly assess each document for potential credit towards the student's chosen academic program, as illustrated in more detail in the diagram of FIG. 18. When the evaluation is complete, it is forwarded to an SSS for a final quality check. The SSS updates the student's database record and e-mails a Transfer Credit Summary (TCS) to the student to notify him/her of the awarded credit. Any student who disagrees with a TCS may initiate an appeal process through the Director of Student Services to have the transcripts reevaluated. Transcripts are also reevaluated if the student requests a change to his/her academic program. The student's file goes through an approval process by the Director of Student Services and the student is notified of the change in credit awarded based on the change in the academic program.

Figure 24:
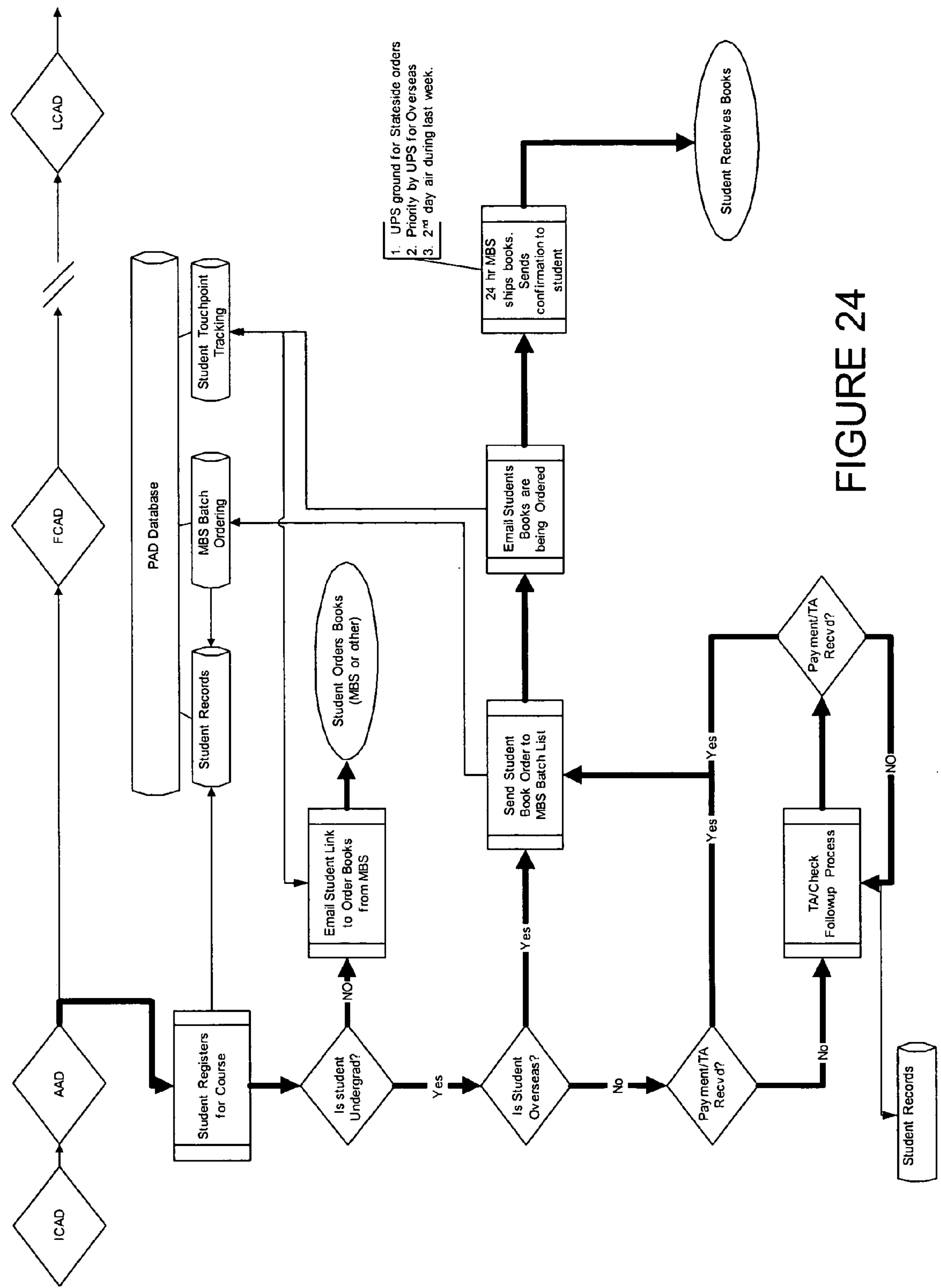
FIG. 24 illustrates a flow diagram of an exemplary ordering of course material process according to an embodiment of the present invention.
Figure 25:
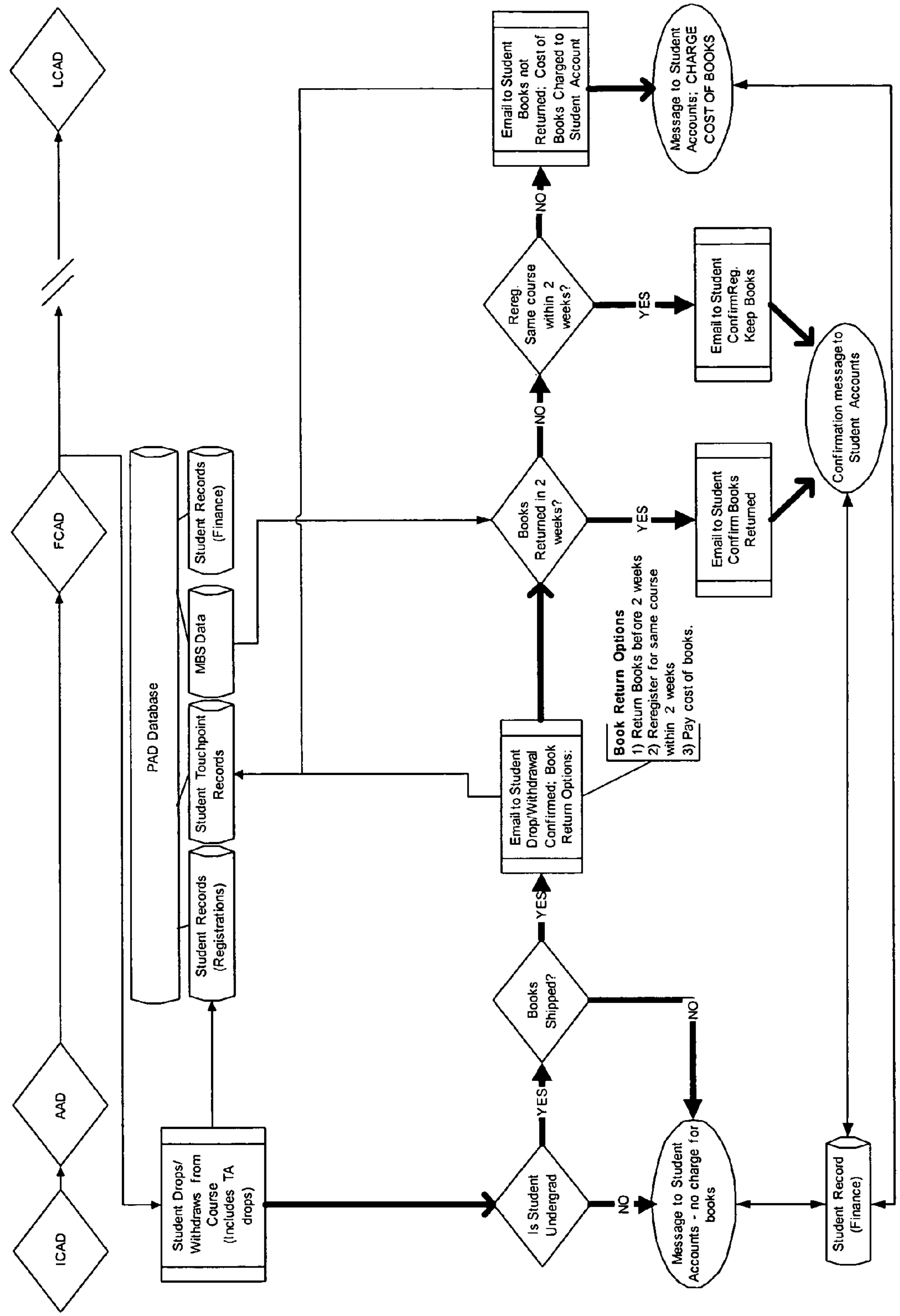
FIG. 25 illustrates a flow diagram of an exemplary course material return process according to an embodiment of the present invention.

Another part of AAD for the student is acquiring course materials. FIG. 24 illustrates in more detail the process flow for ordering course material. After a new student registers for a course and completes payment, the system partners with the student to ensure that the proper materials are sent to the student. For undergraduate students, books are automatically ordered and shipped through the system's Book Grant. The system collates undergraduate course registrations every 24 hours and sends a booklist to the system's vendor for shipment to the students. It generally takes 3-5 days for an undergraduate student to receive the books, with overseas shipments taking longer and oftentimes requiring special arrangements with the student's instructor. For graduate students, the system provides links to an online book resource that stocks all the associated courses materials at reasonable rates. Graduate students are also informed that they may obtain books wherever it is most convenient and cost-effective for them. Details of the converse process flow of returning course materials are illustrated in FIG. 25.

The AAD FOM in FIG. 9 are used to gauge the effectiveness of the AAD process and include the conversion rates of application to orientation, orientation to registration, and application to registration. They also include the number of TCE's received and completed weekly. The metrics estimate the number of courses dropped before the semester starts and the number dropped because the student did not submit military TA paperwork. They also track the number of scholarships awarded and measure delivery time for undergraduate book shipments associated with the system's Book Grant. Certain elements of the AAD FOM are combined with student survey results to make up the Student Satisfaction Quotient (SSQ). The system considers the SSQ as the true indication from the student perspective of the effectiveness of the partnership. The SSQ is placed alongside an analysis of student complaints and suggestions for improvement in order for the system to critique itself and develop corrective measures to strengthen the partnership at a distance.

Figure 10:
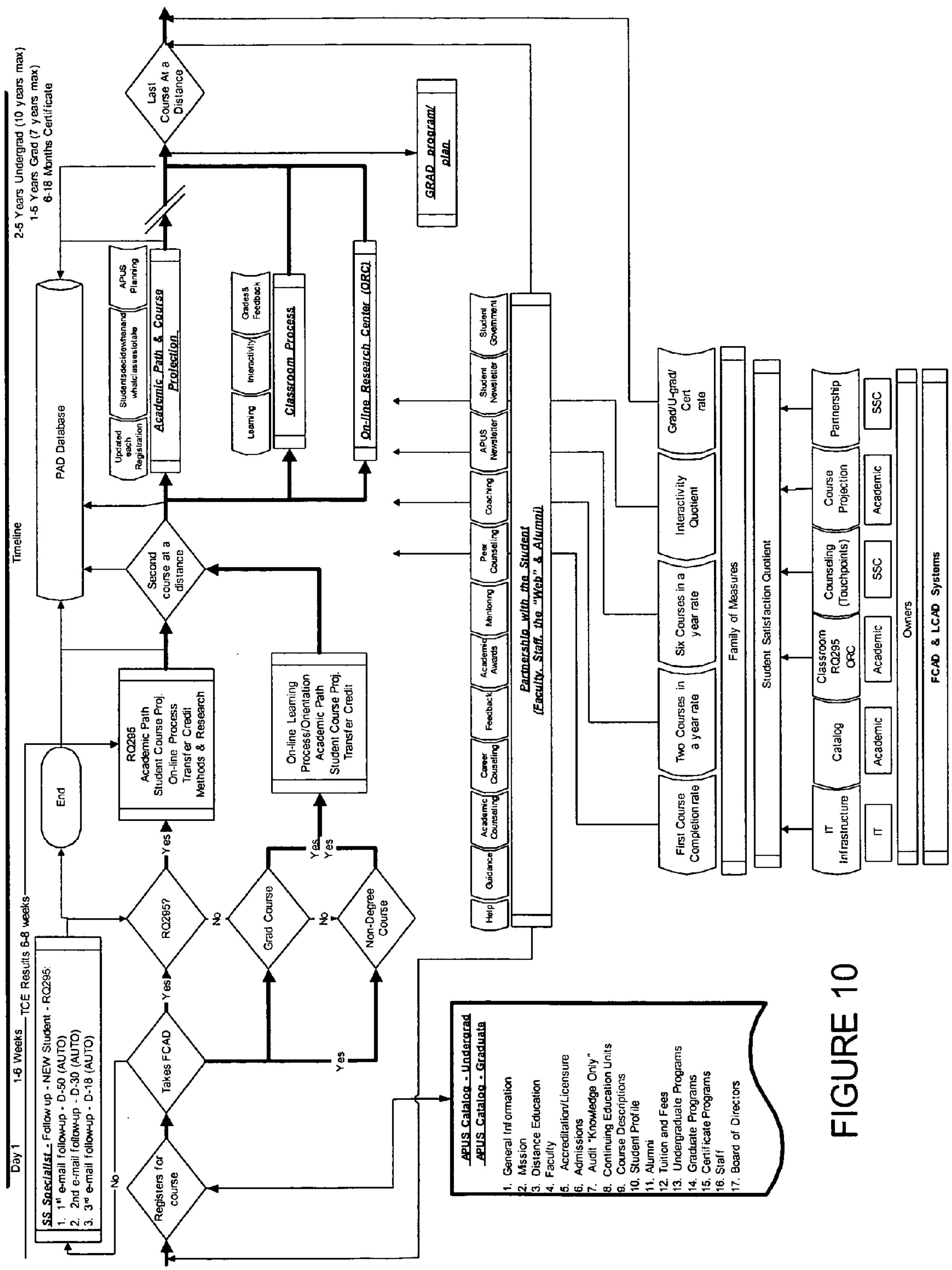
FIG. 10 illustrates a flow diagram of an exemplary student First Course At a Distance (FCAD) process according to an embodiment of the present invention.

The third step of the partnership at a distance is FCAD (First Course At a Distance), illustrated in FIG. 10. It begins when the student registers for the first online course and ends as the student registers for their Last Course At a Distance (LCAD).

Figure 17:
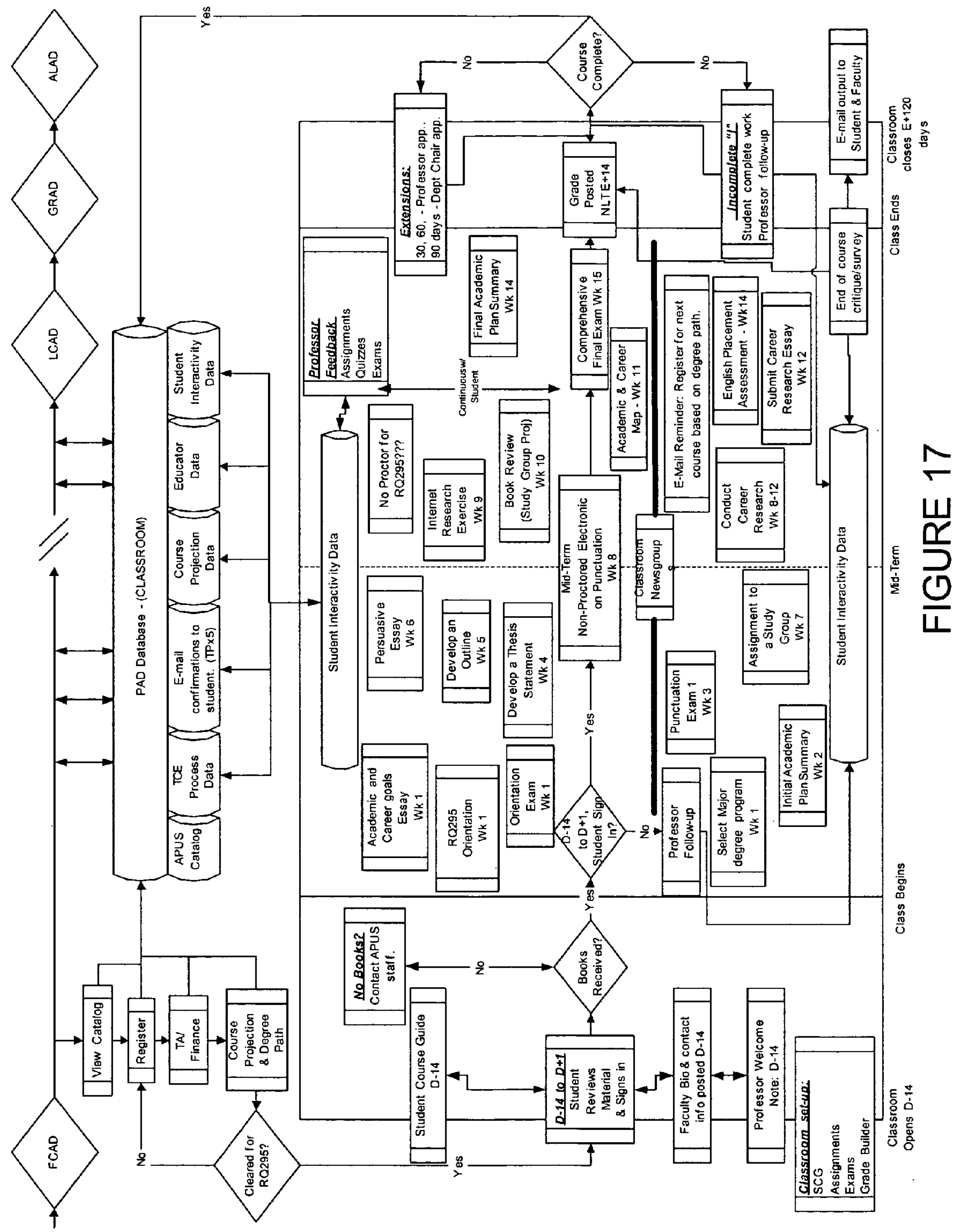
FIG. 17 illustrates a flow diagram of an exemplary orientation class process according to an embodiment of the present invention.

To solidify an effective partnership with an undergraduate student, it is important for the student to understand the online learning process and the set of expectations associated with the partnership at a distance. Undergraduate students who have declared an Associate's or Bachelor's degree as their academic goal have an institutional requirement to take an introductory course titled RQ295 Academic and Career Planning. As illustrated in FIG. 17, RQ295 prepares undergraduate students for academic and distance learning success by helping them develop their own unique academic and career plans, have their writing and research skills assessed, and learn how to use the electronic classroom and campus. The RQ295 professors also assist each student in developing successful study habits and transitioning from prior educational experiences to the system's distance-learning model. Through individual counseling and academic development activities, RQ295 permits students to plan and ensure that their program supports their academic goal. It also helps students develop the essential skills needed to achieve success with the system, and after graduation.

To solidify an effective partnership with a graduate student, those who have no prior experience with distance education are encouraged to take a Research Methods course as their first course. Graduate students are familiar with the education process and do not require the same extensive first course orientation to an academic environment as the undergraduate students. The Research Methods course, however, will better prepare the graduate student for online research and is designed to provide the foundation of skills and understanding that will add to the student's future success. The professors also provide information on how to navigate and work within the online classroom.

Students completing Knowledge Only and CEU courses, and those seeking certificates, may enter directly into any course associated with their specific academic goal. The system's professors use the course roster to identify students who have not completed RQ295 or the graduate research course and provide those students with additional assistance with the online classroom as required.

Figure 26:
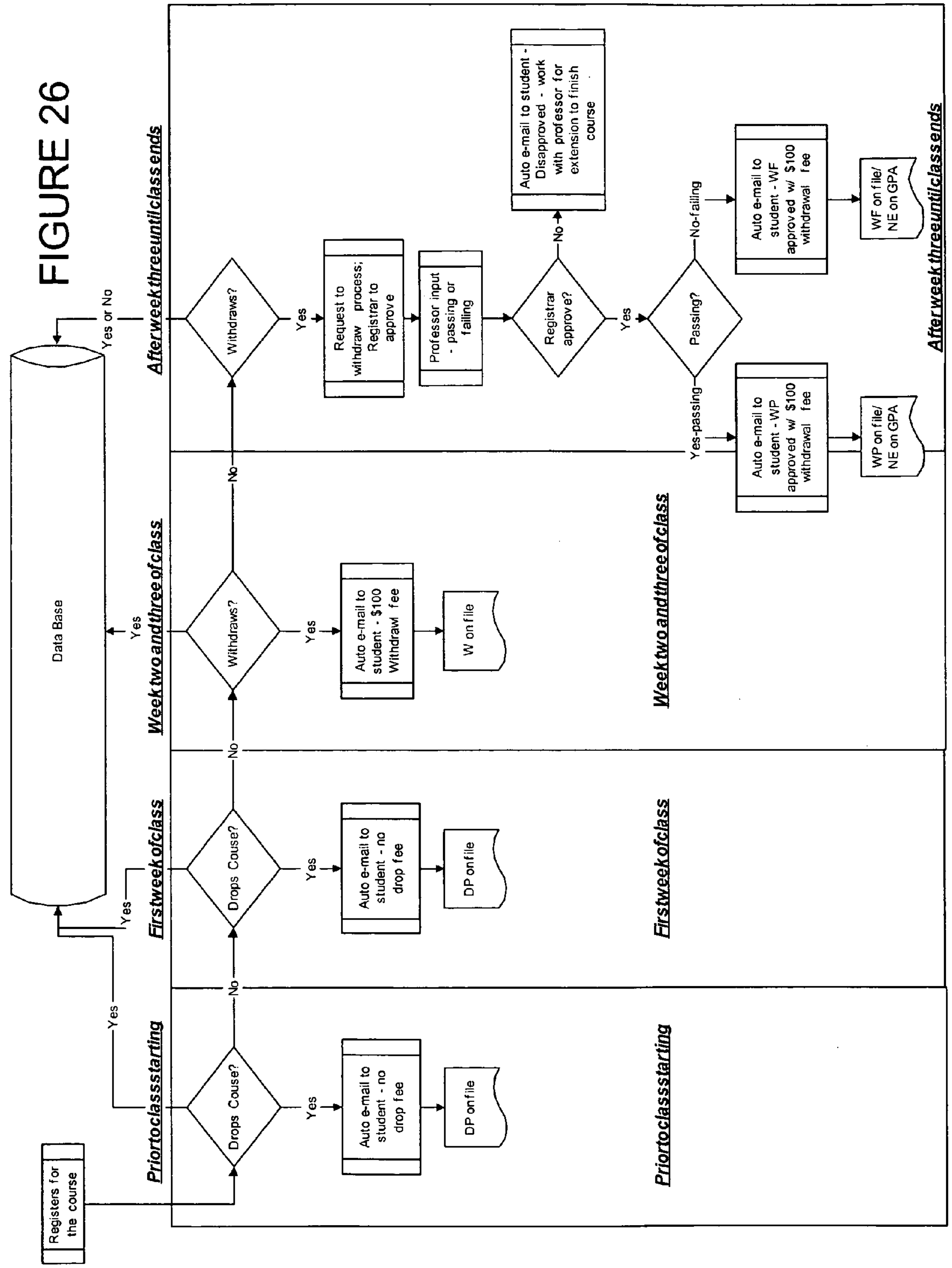
FIG. 26 illustrates a flow diagram of an exemplary drop and withdrawal process according to an embodiment of the present invention.

It is inherent to the academic experience that some students need more help and encouragement than others. Some new students become nervous and drop a course prior to entering the classroom for the first time. Some drop the course within the first week. The SSS's are assigned specific groups of students to track, monitor and assist. Students who register for a course and drop it for one reason or another receive communication and reminders from their SSS. These students are asked how the system can help them to continue their pursuit of education. By partnering with the student at this critical time, the SSS will help motivate these students to achieve their educational goals. A more detailed diagram of the drop and withdrawal process is illustrated in FIG. 26.

A significant part of the PAD process as a whole is the provision of resources to the student. In AAD, the Student Handbook was described as one of those resources. Two other important resources for the student are the system's Catalogs, one for graduate programs and one for undergraduate programs. The catalogs outline all the academic program requirements, program descriptions, and other important information about tuition and fees, financial assistance and the withdrawal procedure and policy. The catalogs and the Student Handbook are the most important resource documents for the student to use to ensure an effective partnership.

After their first course, students must register for all subsequent courses required for their academic goal completion (degree, certificate, SPP, CEUs or Knowledge Only) to continue the partnership as they progress through the learning process. During registration for their first course students complete a payment and book acquisition process. During each subsequent registration, each student can view his/her unique academic path, see any transfer credit applied and all grades of previously completed courses through the Academic Plan in the Student Record Book. Given all this information upfront, it is easy for students to determine the courses that must be taken to complete the requirements for graduation or program completion.

Figure 21:
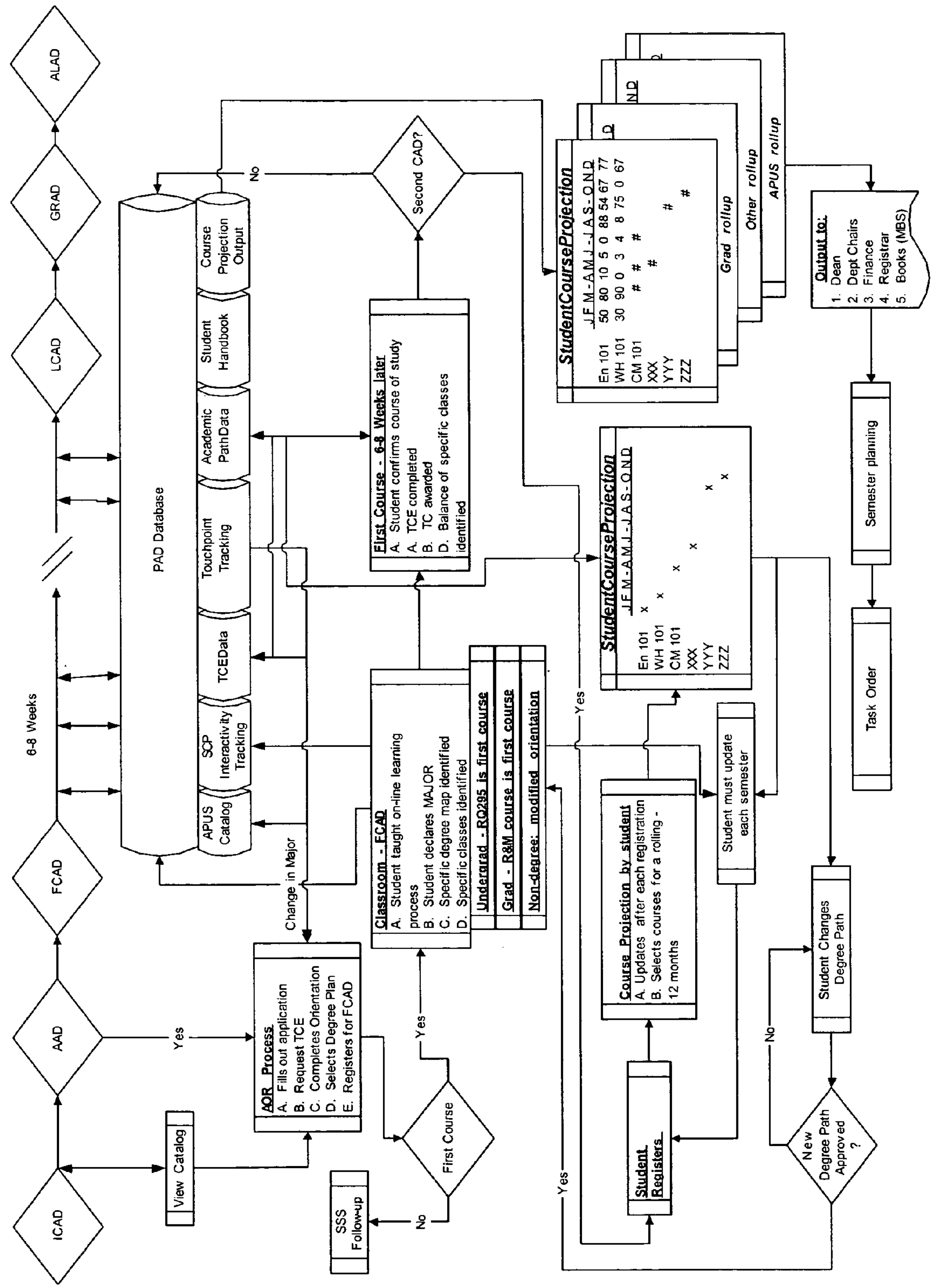
FIG. 21 illustrates a flow diagram of an exemplary student course projection and academic plan process according to an embodiment of the present invention.

As students become aware of their overall plan of completion, they are asked to go through a course projection process which "maps" out the courses they wish to take over the next 12 months. The details of the student course projection and academic plan process flow are illustrated in FIG. 21. Each student may update and make changes to this projection as often as s/he wishes. The information entered by the student is monitored by the Academic Department and used to ensure that courses are offered in the semesters when students have "mapped" them in their course projection. This continual updating process gives the student flexibility and provides the Academic Department with the planning lead-time they need to ensure the system is properly staffed and resourced to deliver the courses.

Through the use of Educator software in the system's online classrooms, students are able to participate in synchronous or asynchronous learning at any time, from any location, using any Internet-capable appliance including the PC, Palm VII or cellular phone. Students may access their online classrooms 14 days prior to the start date of the class (provided that they have submitted payment for the course). They submit homework, take exams, and correspond with the faculty and other students while inside the classroom. They are not required to be online at a particular time of day. However, they must maintain weekly contact with their professor(s) by submitting assignments or sending e-mails from their online classroom mailbox. Classes close permanently 120 days after the end date of the class, giving students on approved course extensions the time they need to complete all course assignments, and the professors the time they need to provide valuable feedback to the student and determine a final grade.

Yet another resource available to the system's students is the Online Research Center (ORC). It is available to all students at all times and focuses on subject-specific Internet resource pages. It is also the starting point for access to online books, periodicals, and research web sites such as LexisNexis Academic, EBSCO's Academic Elite, and Loislaw. The system in the present working example is also a part of two nationwide library consortia that provide InterLibrary Loans (ILL): Online Computer Library Center (OCLC) and the Southeastern Library Network (SOLINET). The ORC is staffed by a system Librarian available to the student via e-mail at any time.

Figure 22:
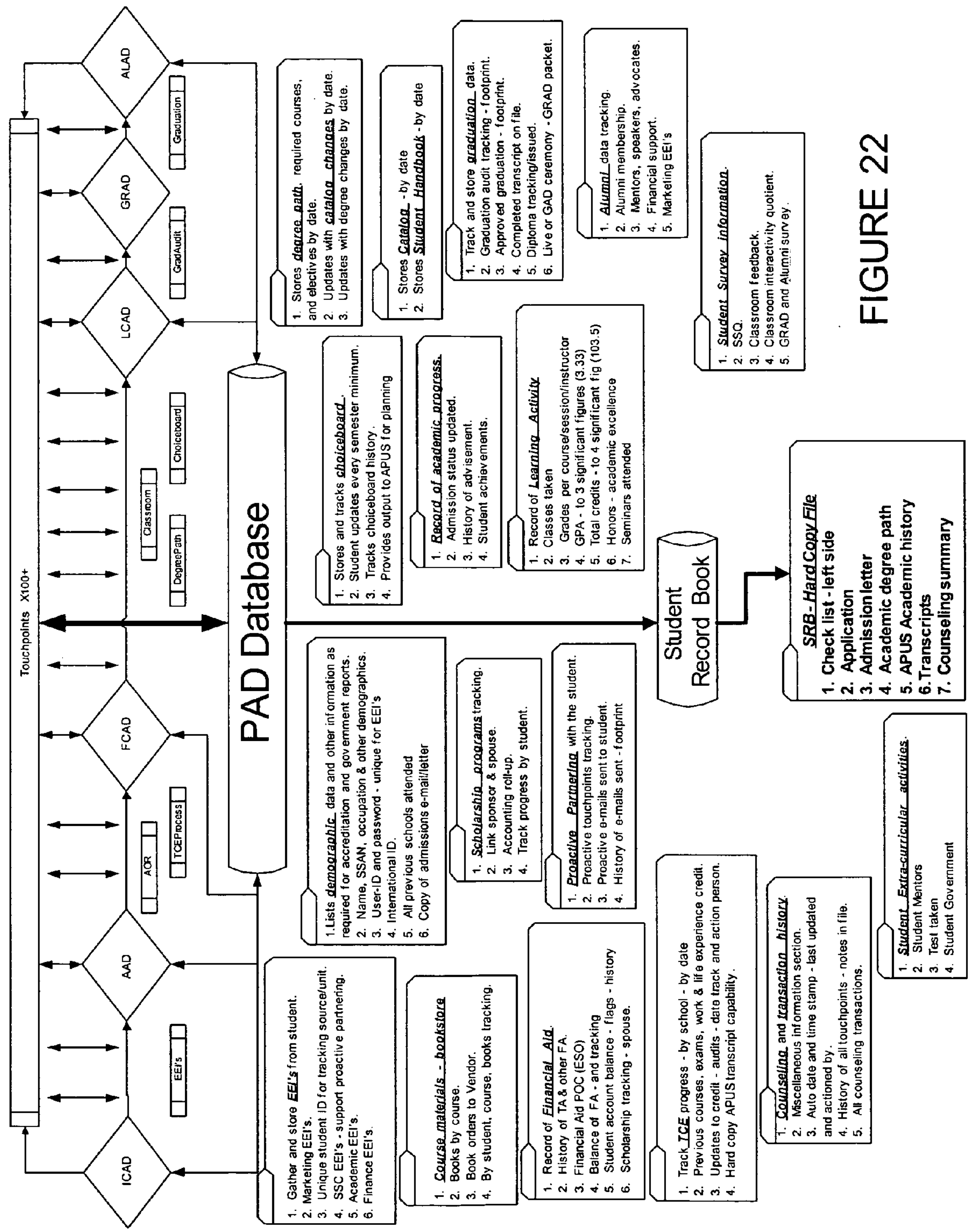
FIG. 22 illustrates a flow diagram of an exemplary Partnership At a Distance (PAD) database and student record book process according to an embodiment of the present invention.

The true test of an effective partnership at a distance occurs in FCAD and continues until program completion. Throughout their experience, students are monitored to ensure that they receive any assistance they need to fulfill their academic goals and reach program completion. Degree-seeking students are tracked to ensure they meet their graduation deadline. An important tool in tracking the students is the PAD database and student record book, the details of which are illustrated in FIG. 22. The major role players vital to the partnership are faculty, staff, peers, alumni, and the website. The opportunities for all of these players to "touch" and assist the student are numerous. Students may need help navigating through the learning process at any time. They may need guidance or academic and career counseling in order to make academic decisions. They are always in need of accurate and timely feedback and rewards for their success through awards, mentoring, coaching, and/or tutoring. They may need things that they are not aware of, such as precise information on changes and improvements to the website or announcements and academic or career opportunities detailed in the student newsletters. In the PAD process these opportunities are called "touch points" and are listed and described in greater detail in the appendix.

The FCAD FOM are used to determine the partnership's effectiveness and the students' satisfaction. A constant measure of the students' progression toward their learning objective presents feedback and data on the strength of the partnership. Some FCAD measures include: first course completion rate; students who passed, failed, dropped, or withdrew from a course; students who took two courses and those who took four; etc. The FOM also measures the interactivity quotient in the classroom by tracking how many students signed in on time, how they progressed with their assignments, and whether the grades were posted in a timely manner. The FCAD FOM also includes a student survey at the end of each course used to analyze the reasons that students dropped, withdrew, or received incompletes.

Figure 11:
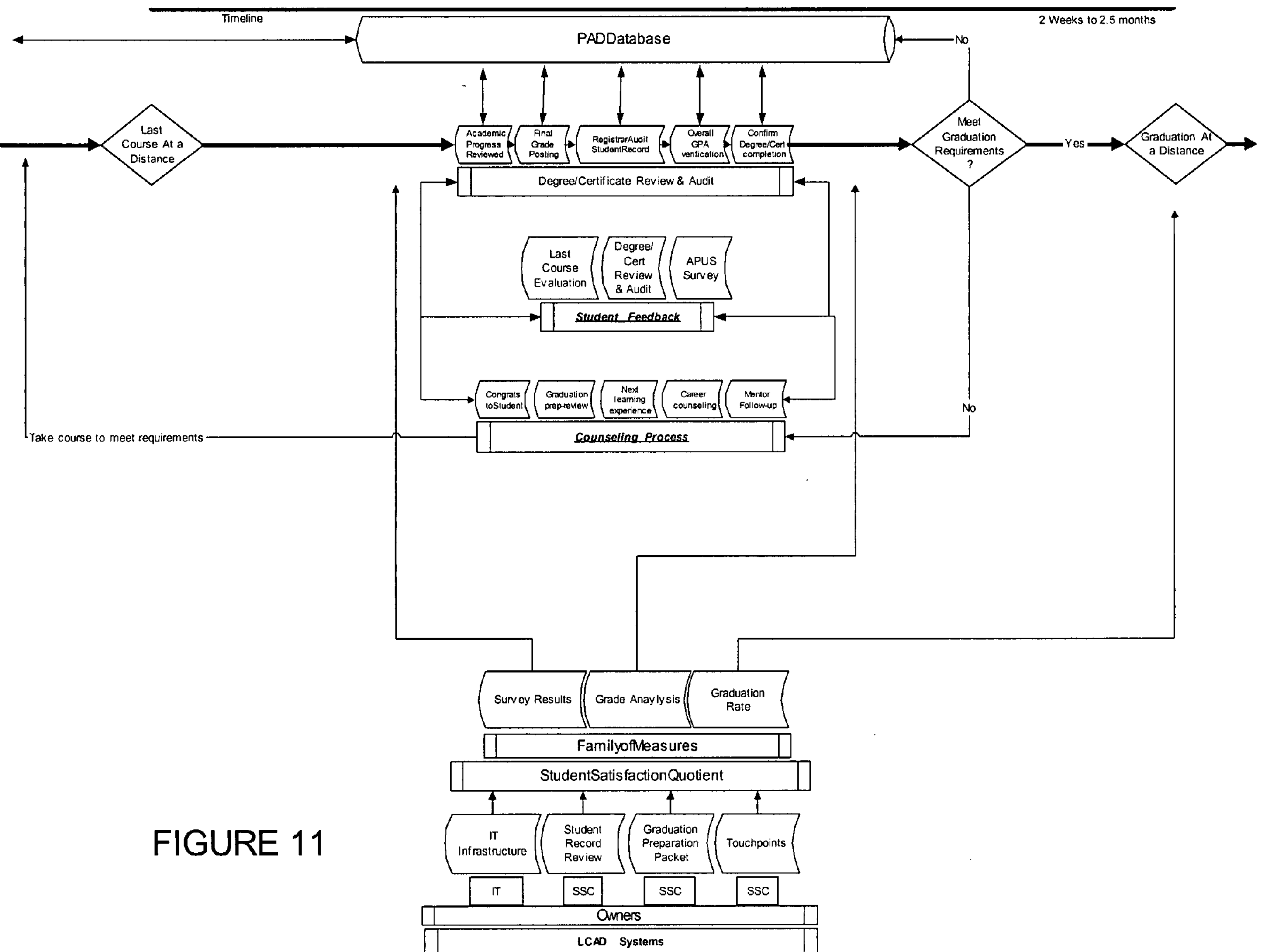
FIG. 11 illustrates a flow diagram of an exemplary student Last Course At a Distance (LCAD) process according to an embodiment of the present invention.

The fourth step of the partnership at a distance is LCAD (Last Course At a Distance), as illustrated in FIG. 11. It begins when the student registers for the last course required for degree or program completion. This registration is much like all other registrations but there are additional steps that must be taken in order to receive a degree or certificate. Students completing a degree are allowed to apply for graduation six semester hours prior to completing their requirements for their degree and must submit a graduation application form from their Student Record.

Currently, the SSS also conducts a graduation audit where the student file is reviewed for program completion. The system can implement a student Academic Plan that will track all program requirements and will be updated as each course is completed or transfer credit is awarded. Using the Academic Plan at each registration will enable the student to progress through the learning experience accordingly. Upon completion, students may choose to graduate at a distance, in person, or both ways. Those who wish to graduate at a distance arrange for their own ceremony after being sent their final transcripts and notified of when to expect their diploma. The system can also conduct a commencement ceremony every June in Washington D.C. to which all graduates from the previous year are invited.

Each graduating student is asked to complete a formal survey that covers the entire Partnership At a Distance and his or her individual learning experience. Students are counseled on their continued education, offered career counseling and extended the opportunity to become a mentor to a current system student.

The LCAD FOM used to measure the effectiveness of the partnership include the formal survey results and grade analysis of the graduates.

Figure 12:
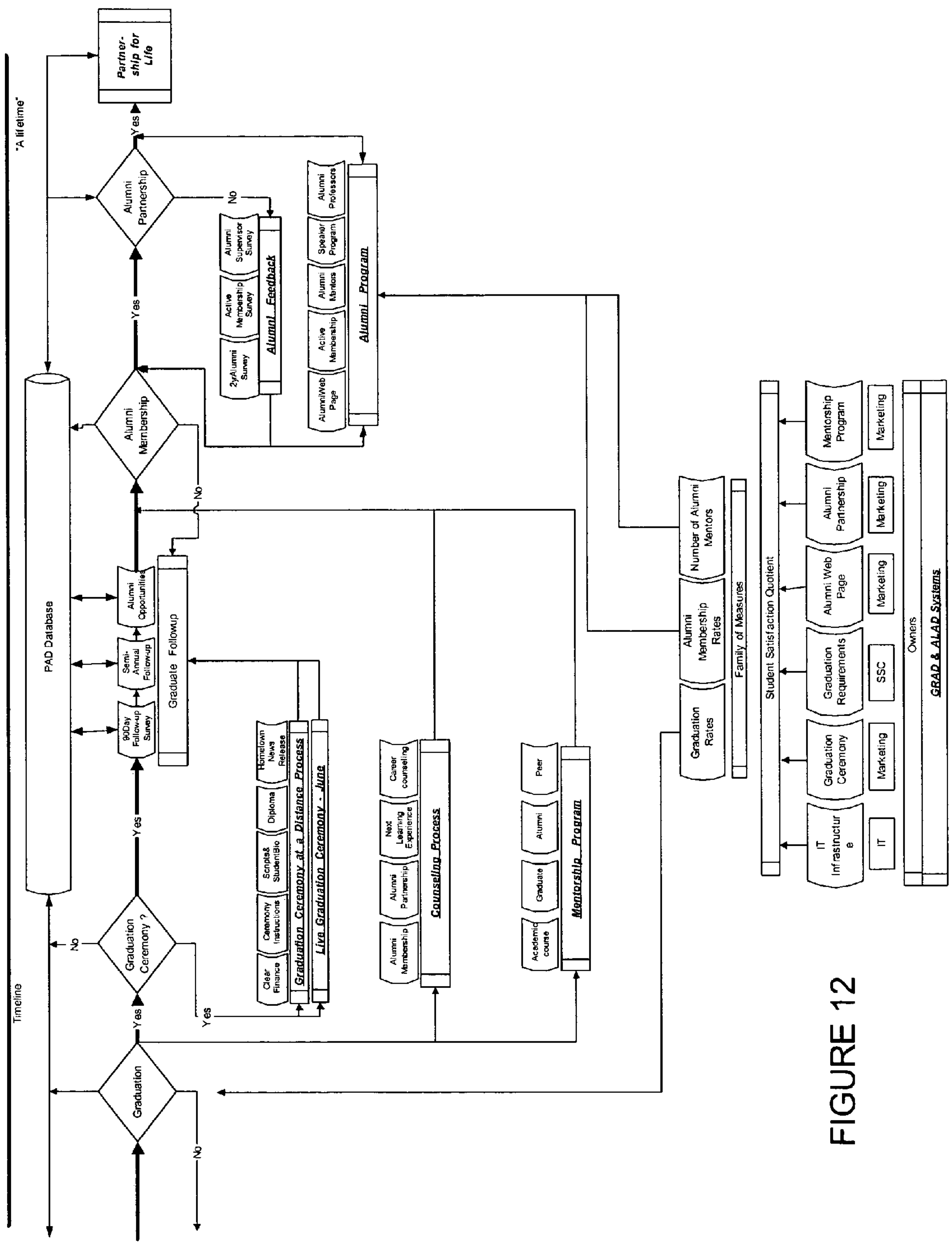
FIG. 12 illustrates a flow diagram of an exemplary student Graduation and Alumni At a Distance (GRAD and ALAD) process according to an embodiment of the present invention.

The fifth and sixth step of the partnership at a distance is GRAD (Graduation At a Distance) and ALAD (Alumni At a Distance), as illustrated in FIG. 12. Some of the activities and programs in GRAD and ALAD are not completely in place in the working example, however, as the system continues to grow and mature, these programs can quickly come to fruition.

Students that complete the degree requirements for graduation can be sent two official transcripts reflecting their degree completion and a congratulations letter from the Chairman of the Board(s). All students who completed their degree program in the previous year can be formally invited to attend the annual system commencement ceremony. The ceremony follows a traditional agenda with faculty attendance, a graduation speaker, procession in academic garb, and conferring of degrees. The ceremony is preferably held in Washington, D.C. due to its easy access by plane, car and metro, and its deep roots in American history.

The system's students have several options with regard to a ceremony. They can attend the annual APUS commencement ceremony, plan to have their diploma presented by an official of their own choice at their own location, or opt to have no ceremony at all. The working example can include a Graduation At a Distance packet for all graduates, which can include recommendations on how to plan and execute a private commencement ceremony, a recap of the student's academic achievements and degree, along with a congratulations letter and information concerning the shipment of their official diploma.

The GRAD FOM are used to calculate the effectiveness of the partnerships via graduation rates, which are measured by cohort, degree and program of study.

ALAD (Alumni At a Distance), as illustrated in FIG. 12, begins upon degree completion and never really ends. The active alumni are APUS partners for life and we depend on them for feedback that helps us to determine in which areas of study excellence was achieved and in which areas improvement is needed. Alumni bring their time and efforts back to the system in continuing to strengthen the partnership with our students and foster a tremendous learning environment.

About 90 days after their degree completion, alumni are sent a survey that focuses on their learning outcomes and the applicability of their academic experience to their work place. The alumni are also asked to provide the names of their current managers who are surveyed to determine the effectiveness of the alumni's course of study on his/her performance. The system alumni are then surveyed every two-years and the information is studied as a part of the PAD improvement process.

Alumni have several opportunities to continue their Partnerships At a Distance with current students and the system. After graduation, alumni are asked to be active members in the alumni association and are given the opportunity to become mentors to current students. They also have the opportunity to help promote our educational programs through speaking engagements and meetings with prominent business executives or, if qualified, become faculty members.

The ALAD FOM are used to determine the effectiveness of the Alumni At a Distance via the numbers of alumni actively involved in alumni programs and the association, and the numbers of alumni mentors.

Figure 13:
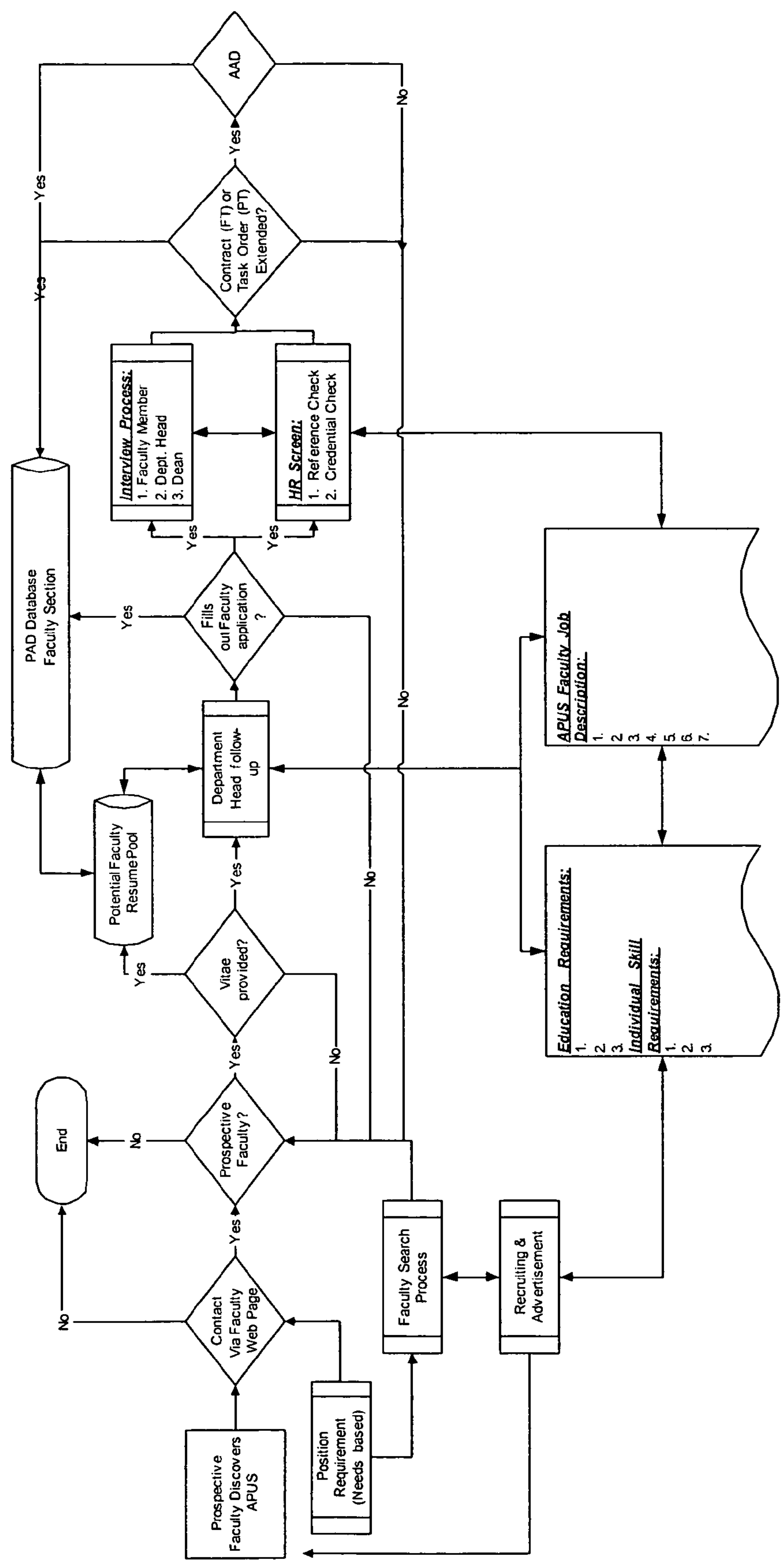
FIG. 13 illustrates a flow diagram of an exemplary faculty Initial Contact At a Distance (ICAD) process according to an embodiment of the present invention.

The faculty perspective of the PAD is illustrated in FIGS. 13-16. A strong partnership with the student is paramount to the achievement of the perfect learning experience as seen from the student perspective. Second only to that is the strength of our Partnership At a Distance with our full- and part-time faculty. Faculty ICAD, as illustrated in FIG. 13, begins when a potential faculty member contacts the system through the web, e-mail, regular mail, in person or through a referral, and ends when the screening process has been completed.

The Faculty PAD diagrams, shown in FIGS. 13-16, portray a process flow from the perspective of the full- and part-time faculty, starting with faculty ICAD (Initial Contact At a Distance), and moving through AAD (Acceptance of faculty At a Distance), and FCAD (teaching the First Course At a Distance). How the system partners with this important resource will determine in large measure the success of the Partnership At a Distance with the student. The faculty ICAD process is important in enabling the system to recruit and hire the right resources to facilitate the learning experience for its students.

Figure 14:
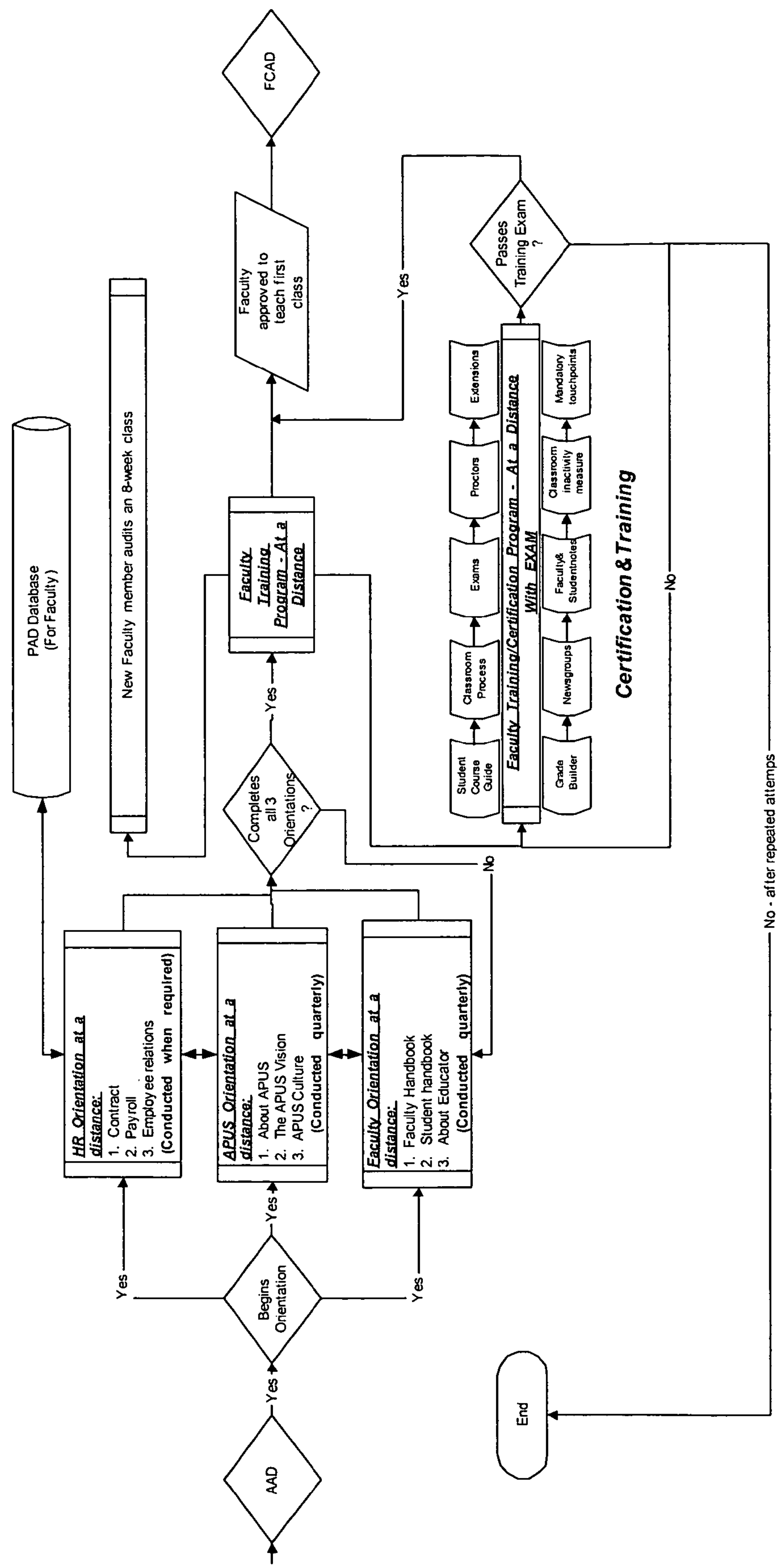
FIG. 14 illustrates a flow diagram of an exemplary faculty Acceptance At a Distance (AAD) process according to an embodiment of the present invention.

Faculty AAD (Acceptance of faculty At a Distance) begins, as illustrated in FIG. 14, when the faculty member is offered a contract with the system and ends when the faculty member teaches his/her first course. Each prospective faculty member is asked to fill out an application and submit a resume with curriculum vitae. Proper screening of the pool of candidates includes resume and application review, applicant interview, resource and reference checking, and educational credential verification. Each applicant's specific skills, experience and resources are identified and compared to all openings in individual programs and courses for a potential match.

All new faculty members accepting a contract with the system must participate in a faculty orientation, training, and audit a live course before they are permitted to teach a course. They must go through orientation to the system and PAD, and the specifics of the online course and Educator classroom software. They also must complete a new faculty orientation and training on all faculty key elements, such as the student course guide, the classroom process, exams, proctors, extensions, grade builder, newsgroups, faculty and student notes, classroom inactivity measure and mandatory touch points. At the end of the training, they must pass a training exam before they are permitted to teach their first course.

Figure 15:
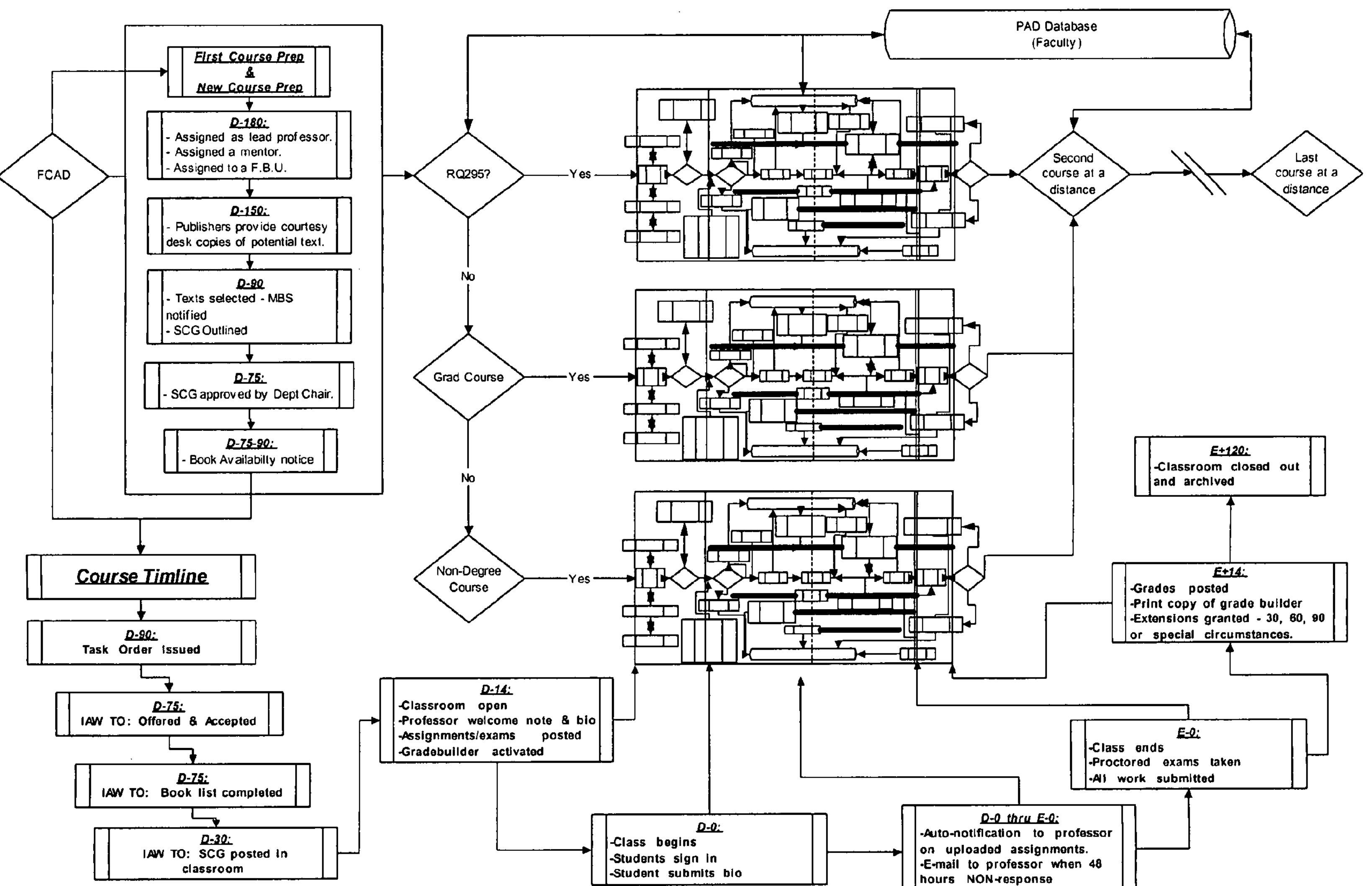
FIG. 15 illustrates a flow diagram of an exemplary faculty First Course At a Distance (FCAD) process according to an embodiment of the present invention.
Figure 16:
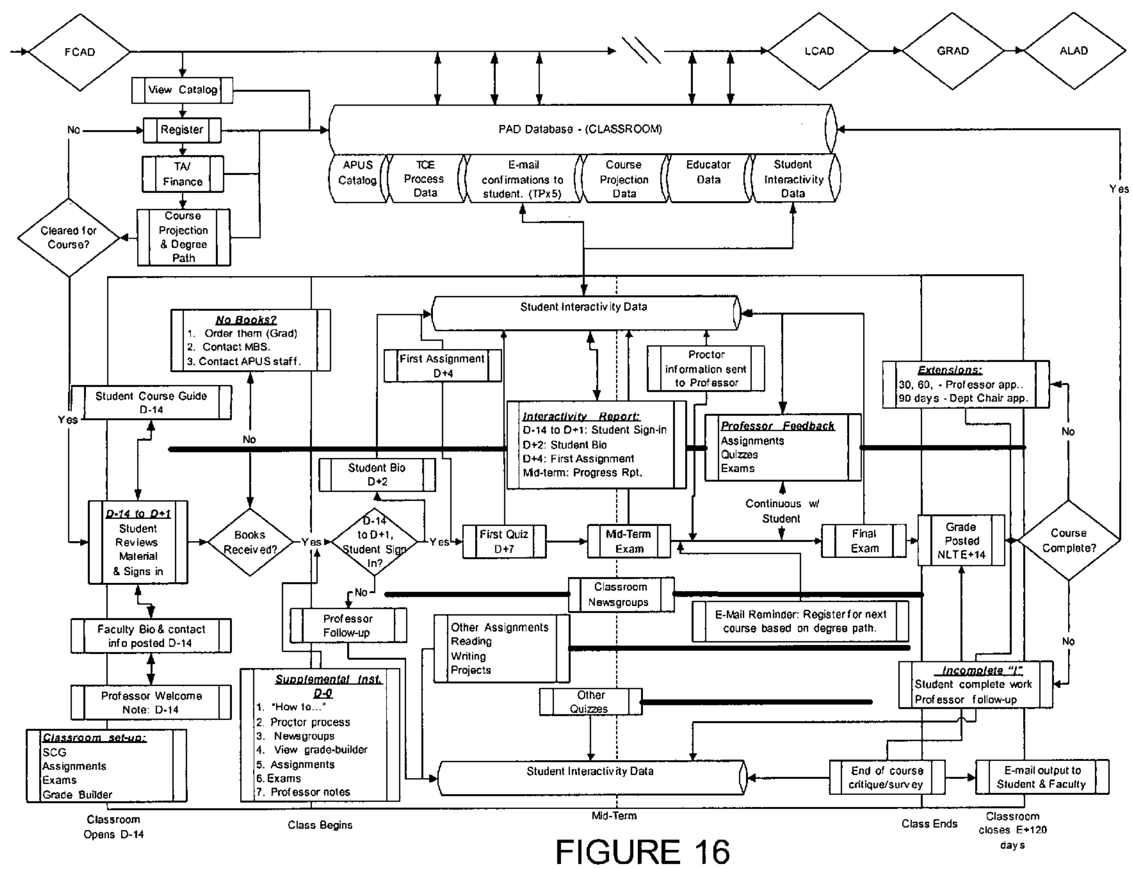
FIG. 16 a flow diagram of an exemplary classroom process according to an embodiment of the present invention.

Faculty FCAD (teaching First Course At a Distance) begins, as illustrated in FIG. 15, when a course is assigned to a new faculty member and covers the classroom process flow (shown in FIG. 16). For the purpose of this section: D=the first day of class and E=the end date of the class.

At D−180, 180 days before the class starts, the new faculty member is assigned to a course and a mentor, and an Academic Department to which s/he will report. At D−150, book publishers provide the new professor with courtesy desk copies of potential text and course materials. At D−90, textbooks must be selected and the book vendor notified. Between 90 and 75 days prior to the start date of the course, the faculty member must create a Student Course Guide (SCG) outline and submit it to the Department Chair for approved no later than D−75. At D−30, the approved SCG must be posted in the classroom.

As illustrated in the Classroom Process Flow Schedule of FIG. 16, about 2 weeks prior to the start date of class (D−14), the online classroom opens. At this time the SCG, the professor's welcome note and all assignments and exams dates must be posted inside the classroom. The grade-builder software package must also be activated.

At D−0, when classes begin, the new professor much check to see that the students have signed into the classroom and submitted their personal information. During the course of the class, the professor must maintain interactivity with the students through feedback, grades and e-mails. Interactivity between students and the faculty member is measured by the rate students keep up with their assignments and complete their exams on time. At E−0, or the end date of class, students should have submitted all coursework. By E+14, two weeks after the end of class, the faculty must post final grades. At E+120, the online classrooms shut down permanently. Professors and the Academic Dean may grant course extensions for students with extenuating circumstances, however all coursework should be completed before E+120.

Figure 23:
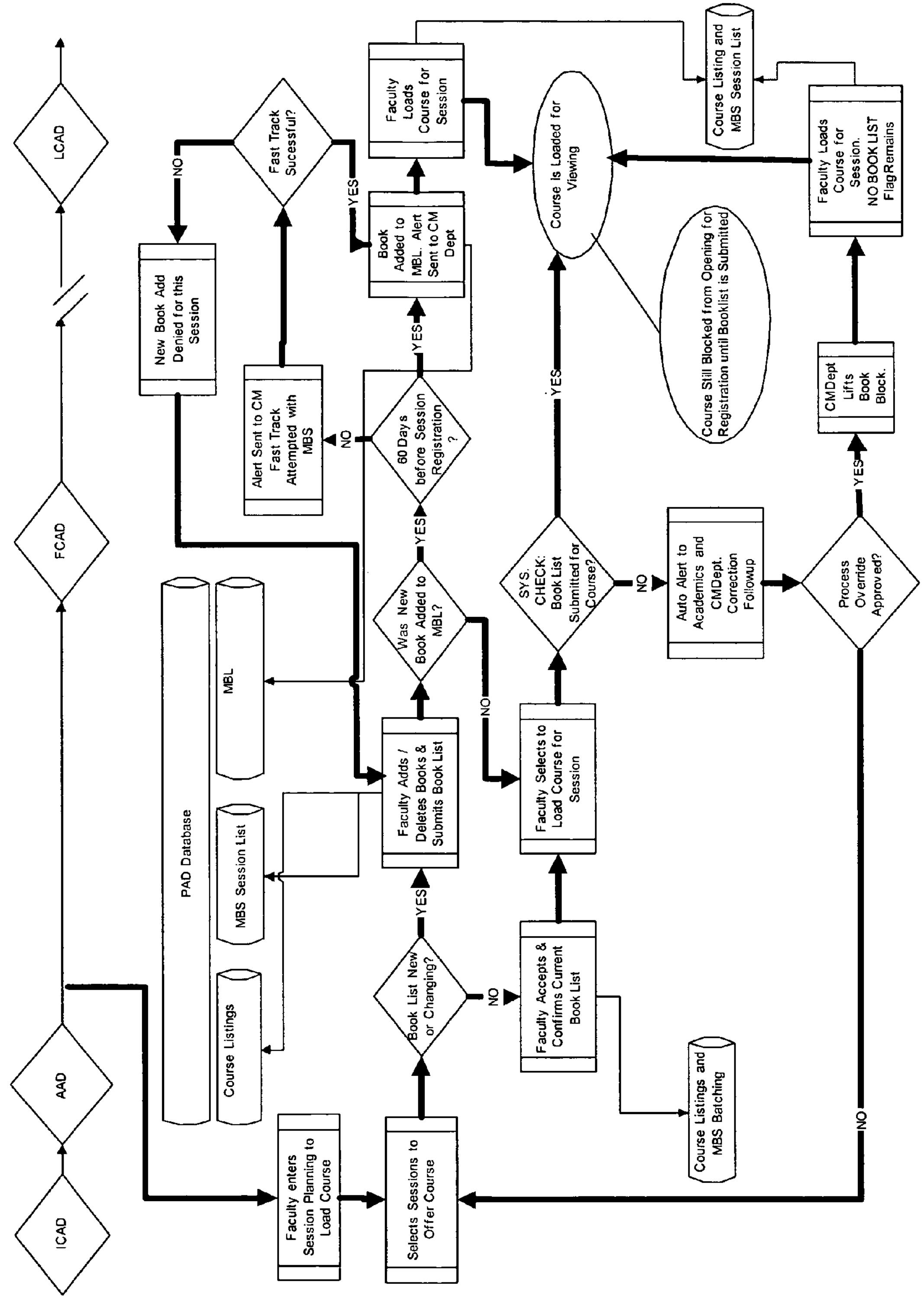
FIG. 23 illustrates a flow diagram of an exemplary course material submission process according to an embodiment of the present invention.

As illustrated in detail in FIG. 23, the faculty are involved in the process flow for course materials submission. By using a detailed process, the system can assure that courses will not be added or offered until the course materials are finalized, yet still provide a "fast-track" for altering course materials.

Each and every staff member of the system plays a role in partnering with the student. Communication and understanding are the cornerstones of the PAD process. "High tech" and "high touch" are the ingredients to a successful partnership, and each should be constant throughout every student's learning experience. From the creation of ample and accessible information on the web to the various types of EMS, SSS, and CSS assistance, and the involvement of the staff and faculty,—ALL are part of providing guidance and direction to facilitate the partnership.

There are many opportunities for the web, staff, and faculty to communicate with, or "touch", various students throughout their partnership at a distance. In the PAD concept these opportunities are called Touch Points and they are categorized as follows: Academic Counseling, Acknowledgement, Follow-Up, Informational, Motivational, and Survey.

Through the PAD improvement process and experience, the working example of the system has established 1,595 Touch Points to facilitate the presented learning experience of a degree-seeking undergraduate. The average student won't need to be touched by all of these. Many of the Touch Point messages are sent out depending on the student's specific requirements or needs. Students who reach their academic goal and progress from applicant to alumnus with no need for special contact with staff or faculty will receive automatically the following number of e-mailed Touch Points during their partnership:

| | |
|---|---|
| Academic Counseling | 22 |
| Acknowledgement | 53 |
| Follow-Up | 23 |
| Informational | 36 |
| Motivational | 5 |
| Survey | 9 |

The following appendix lists each Touch Point and its characteristics: where it occurs in the learning experience (ICAD, AAD etc.), its triggering event (orientation, admissions, registration, etc.), its category (acknowledgement, follow-up, etc.), the method of contact (e-mail, phone or static web), its frequency, and the nature of the message.

A system and method for optimizing the effectiveness of a virtual university environment has been described. It will be understood by those skilled in the art of the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for optimizing the effectiveness of a university environment comprising:

receiving at a server a selection of course offerings from a member of a student body from a student access device for a time period, wherein the student body comprises a plurality of students;

using the server to compile the selected course offerings of each member of the student body into a dynamic resource allocation plan at a point in time according to a first set of rules;

using the server to determine the resources required to execute the dynamic resource allocation plan over the time period at the point in time according to a second set of rules; and using the server to recompile the dynamic resource allocation plan at a second point in time when the selected course offerings of any one member of the student body changes according to the first set of rules.

2. The method of claim 1, further comprising:

establishing one or more triggering events relating a behavior of the student body member to a student need;

monitoring the behavior of the student body member for the occurrence of a triggering event;

initiating a response to address the student need when the triggering event occurs; and using the server to recompile the dynamic resource allocation plan to reflect the response according to the first set of rules.

3. The method of claim 1, further comprising:

using the server to capture data relating a behavior of a prospective student to one or more effectiveness metrics;

using the server to calculate one or more effectiveness metrics from the captured data;

using the server to compare one of the one or more calculated effectiveness metrics to a target for that effectiveness metric; and initiating a response when the one of the one or more effectiveness metrics does not meet or exceed the target for that metric.

4. The method of claim 1 further comprising:

using the server to capture data relating a behavior of the student body member to one or more effectiveness metrics;

using the server to calculate one or more effectiveness metrics from the captured data;

using the server to compare one of the one or more calculated effectiveness metrics to a target for that effectiveness metric; and initiating a response when the one of the one or more calculated effectiveness metrics does not meet or exceed the target for that metric.

5. The method of claim 1, wherein the dynamic resource allocation plan comprises classes scheduled by the student body and classes projected to be scheduled at future points in time.

* * * * *